United States Patent [19]
Sasaki et al.

[11] Patent Number: 5,924,196
[45] Date of Patent: Jul. 20, 1999

[54] ACCUMULATOR, PROCESS AND APPARATUS FOR MAKING THE SAME

[75] Inventors: Kenji Sasaki, Sizuoka-ken; Katsumi Matsui, Kakegawa, both of Japan

[73] Assignee: Nok Corporation, Tokyo, Japan

[21] Appl. No.: 09/061,878

[22] Filed: Apr. 17, 1998

Related U.S. Application Data

[62] Division of application No. 08/506,882, Jul. 25, 1995, Pat. No. 5,771,936.

[30] Foreign Application Priority Data

Jul. 25, 1994 [JP] Japan ................................. 6-172710
Jul. 28, 1994 [JP] Japan ................................. 6-172711

[51] Int. Cl.⁶ .......................... B23P 19/04; B21D 39/00
[52] U.S. Cl. ...................... 29/890.06; 29/454; 29/455.1; 29/511; 29/520
[58] Field of Search ............................ 29/511, 520, 456, 29/454, 455.1, 890.06, 801, 243.5, 243.517, 243.519, 243.57, 283.5

[56] References Cited

U.S. PATENT DOCUMENTS

| | | | |
|---|---|---|---|
| 1,615,591 | 1/1927 | Mallory | 228/214 |
| 3,345,725 | 10/1967 | Peters | 29/890.06 |
| 3,408,731 | 11/1968 | Mercier | 29/511 |
| 3,627,612 | 12/1971 | Greer | 156/306.9 |
| 3,907,000 | 9/1975 | Carr | 138/30 |
| 3,930,521 | 1/1976 | Zahid | 138/31 |
| 4,190,196 | 2/1980 | Larsen | 138/30 |
| 4,295,492 | 10/1981 | Zahid | 138/30 |
| 4,352,231 | 10/1982 | Jacobelis | 29/454 |
| 4,408,635 | 10/1983 | Packer | 138/30 |
| 4,425,698 | 1/1984 | Petrie | 29/454 |
| 4,509,557 | 4/1985 | Sugimura | 138/30 |
| 4,723,577 | 2/1988 | Wusterbarth | 138/30 |
| 4,997,009 | 3/1991 | Niikura et al. | 138/30 |
| 5,062,455 | 11/1991 | Schurter et al. | 138/30 |
| 5,353,840 | 10/1994 | Paley et al. | 138/30 |
| 5,542,453 | 8/1996 | Gabas | 138/31 |
| 5,618,629 | 4/1997 | Takamatsu et al. | 138/141 |

FOREIGN PATENT DOCUMENTS 5-50106  7/1993  Japan .

*Primary Examiner*—David P. Bryant
*Attorney, Agent, or Firm*—Jacobson, Price, Holman & Stern, PLLC

[57] ABSTRACT

A shell is constituted by an outer shell and an end plate. The end plate has a port in communication with a liquid chamber. A bladder divides an internal space of the shell into a liquid chamber and a gas chamber. A gas is introduced into the gas chamber without the provision of a gas inlet hole in the outer shell located on the side of the gas chamber. For example, an accumulator is assembled by combining the outer shell, the end plate and bladder under atmosphere of a high pressure gas.

13 Claims, 18 Drawing Sheets

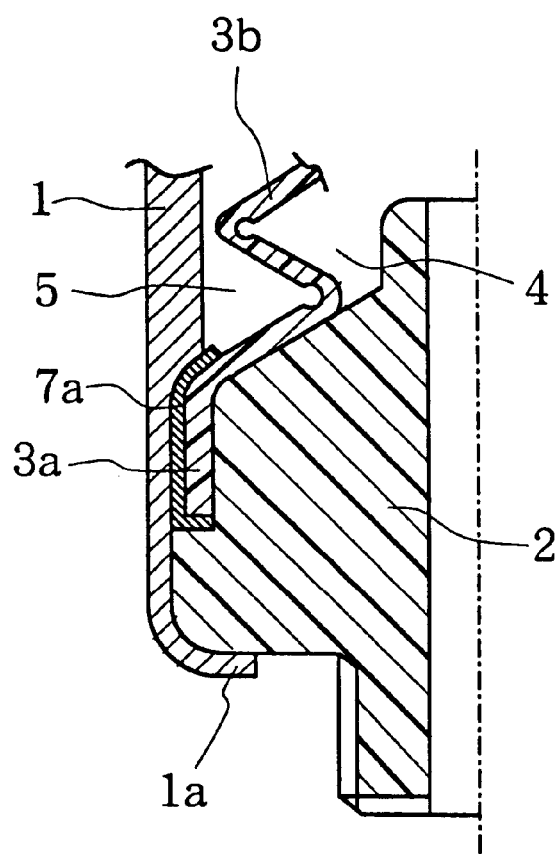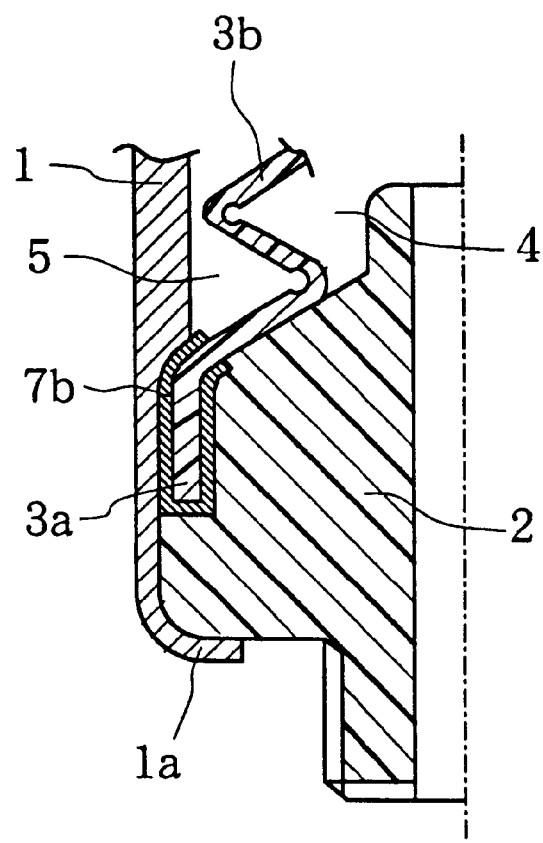
FIG. 14A
FIG. 14B

ACCUMULATOR, PROCESS AND APPARATUS FOR MAKING THE SAME

This is a Divisional of application Ser. No. 08/506,882 filed Jul. 25, 1995.

FIELD OF THE INVENTION

The present invention relates to an accumulator, process and apparatus for making the accumulator.

PRIOR ART

A well known accumulator has an accumulator chamber constituted, for example, by an outer shell and an end plate. The accumulator chamber is divided by a bladder into a liquid chamber and a gas chamber. The gas chamber is filled with a gas to apply a predetermined pressure to a fluid introduced into the liquid chamber to prevent a fluctuation in pressure (such as a water hammer) of piping systems or a fluid machineries in communication with the liquid chamber.

Therefore, a shell is bored with a gas inlet hole, from which gas is introduced to increase a pressure in the gas chamber to a predetermined level, after which a plug with an O-ring is screwed into the gas inlet hole or a plate is welded to the gas inlet hole to seal the gas chamber.

However, the above described accumulator has been suffered from the following problem.

First, since in screwing the plug, the shell need be formed with internal threads, it is necessary to make thick a wall thickness of the shell. This gives rise to a problem in that the entire shell becomes heavy, which cannot be used for objects such as a vehicle which must be light in weight. In addition, a height of the accumulator increases its height as high as a gas plug, which is very disadvantageous in the case where the accumulator is installed in a narrow space.

There is a further disadvantage that when a shell is made thin and welded, its weight increases from the wall thickness of a welded portion due to the welding and the welding cost increases.

Further, in assembling the accumulator, the plug and the threaded portion render the assembling work difficult.

SUMMARY OF THE INVENTION

The present invention relates to an accumulator, process and apparatus for making the same, which prevent a gas leak from a gas chamber, reduce the number of parts constituting the accumulator to reduce the number of fabrication steps, and reduce the weight and height of the accumulator.

The present invention relates to an accumulator and an apparatus for making the same, in which an internal space formed by a shell is divided by a bladder into a liquid chamber and a gas chamber. Particularly, assembling of the bladder is carried out within a closed space under a pressurized gas atmosphere above one (1) atmospheric pressure. For example, a plurality of elements of a temporarily mounted accumulator are placed in a gas atmosphere of high pressure to be enclosed, and a pressurized gas is enclosed into the gas chamber, in which condition the bladder is mounted within the shell. With this, it is not necessary to form a gas inlet hole in the shell. It is possible to introduce the gas into the gas chamber without the gas inlet hole being sealed by a plug.

Preferably, a bladder is held by a shell through a pressure member such as a collar provided within a gas chamber to form a shell and at the same time locate the bladder.

The accumulator according to the present invention comprises a first member and a second member, a shell having an internal space formed by the members, fixing means for fixing the first member to the second member, and a bladder disposed in the internal space of sad shell to divide the internal space into a liquid chamber and a gas chamber. The gas chamber is formed by the first member and the bladder. The liquid chamber is formed by the second member and the bladder. The second member has a port, through which a liquid is introduced into the liquid chamber. The gas chamber receives gas therein. The gas is a gas introduced into the gas chamber before the first member is fixed to the second member by the fixing means. The first member has no hole for introducing the gas into the gas chamber. An example of the fixing means is a means for fixing the second member to the first member by caulking the first member. A further example of the fixing means is a means for screwing an opening at one end of the first member to an outer peripheral portion of the second member.

There is provided an annular pressure member having a contact surface for pressing a joining surface of a mounting portion of the bladder against the second member. A pressing member having a wedge-shape in section is provided between the first member and the second member, the pressing member pressing the mounting portion of the bladder against the second member.

An inner wall of the first member presses the mounting portion of the bladder against the second member.

A first seal ring is interposed between the bladder and the second member, and a second seal ring is interposed between the first member and the second member. Further, a third seal ring is interposed between the pressing member and the first member. The gas is $N_2$, $CO_2$, Ar or He.

When the pressure of the liquid chamber is one atmospheric pressure, the pressure of the gas is above one atmospheric pressure.

One example of the process for making according to the present invention includes a step of forming a shell having an internal space by a first member and a second member, a step of dividing the internal space of said shell into a gas chamber and a liquid chamber by a bladder, and a step of fixing said bladder to said shell in a state where said gas chamber and said liquid chamber in said shell are placed in a common pressurized gas. Preferably, the first member, the second member and the bladder are assembled within a closed space in which said pressurized gas is received.

A further process according to the present invention includes a step of forming a shell having an internal space by a first member and a second member, a step of dividing the internal space of said shell into a gas chamber and a liquid chamber by a bladder, and a step of making said liquid chamber negative pressure to place said bladder in a minimal compressed state, a step of introducing a gas into said gas chamber within said shell, and a step of fixing said bladder to said shell. Particularly, the first member, the second member and the bladder are assembled within a closed space in which said pressured gas is received.

A still another example of a process for making an accumulator according to the present invention is as follows.

The first member of the shell is held on a first mold, and the second member of the shell is held on a frame, in which state when the first mold and a second mold are united, a closed space is formed therein.

Thereafter, a gas is supplied by gas supply means from a gas inlet hole bored in at least one of the first mold and the second mold into the closed space to place the interior and exterior of the shell in a high pressure gas atmosphere. Thereby a high pressure gas is introduced into the internal space of the shell in a temporarily mounted state through a gap between the first member and the second member.

Finally, in the state where the first mold and the second mold are united, the frame is moved close to the first mold, and final assembling of the shell is carried out. Thereby, it is possible to introduce the gas into the gas chamber without provision of the gas inlet hole in the shell.

One example of an apparatus for making an accumulator according to the present invention includes the following:

a first mold for supporting a first member, a second mold provided movably relative to said first mold and cooperating with said first mold to form a closed space therein, a means for holding the second member provided movably toward said first mold within said second mold, a gas supply means for supplying a gas from a gas inlet hole bored at least one of said first mold and said second mold into said closed space, and a fixing means in which in a state where said closed space contains the gas, said first member is fixed to said second member within said closed space to form a shell, a bladder is fixed within said shell, and said gas remains in a gas chamber and a liquid chamber formed by said first member, said second member and said bladder.

A preferable example of the fixing means is a means for bending caulking said first member to said second member.

BRIEF DESCRIPTION OF THE DRAWINGS

FIG. 14A is a sectional view of essential parts showing a construction of a bellows mounting portion shown in FIG. 13; FIG. 14B is a sectional view of essential parts showing a construction of a bellows mounting portion according to another embodiment;

DESCRIPTION OF THE EMBODIMENTS

A plurality of preferred embodiments of the present invention will be described hereinafter with reference to the drawings.

EMBODIMENT 1

Figure 1:
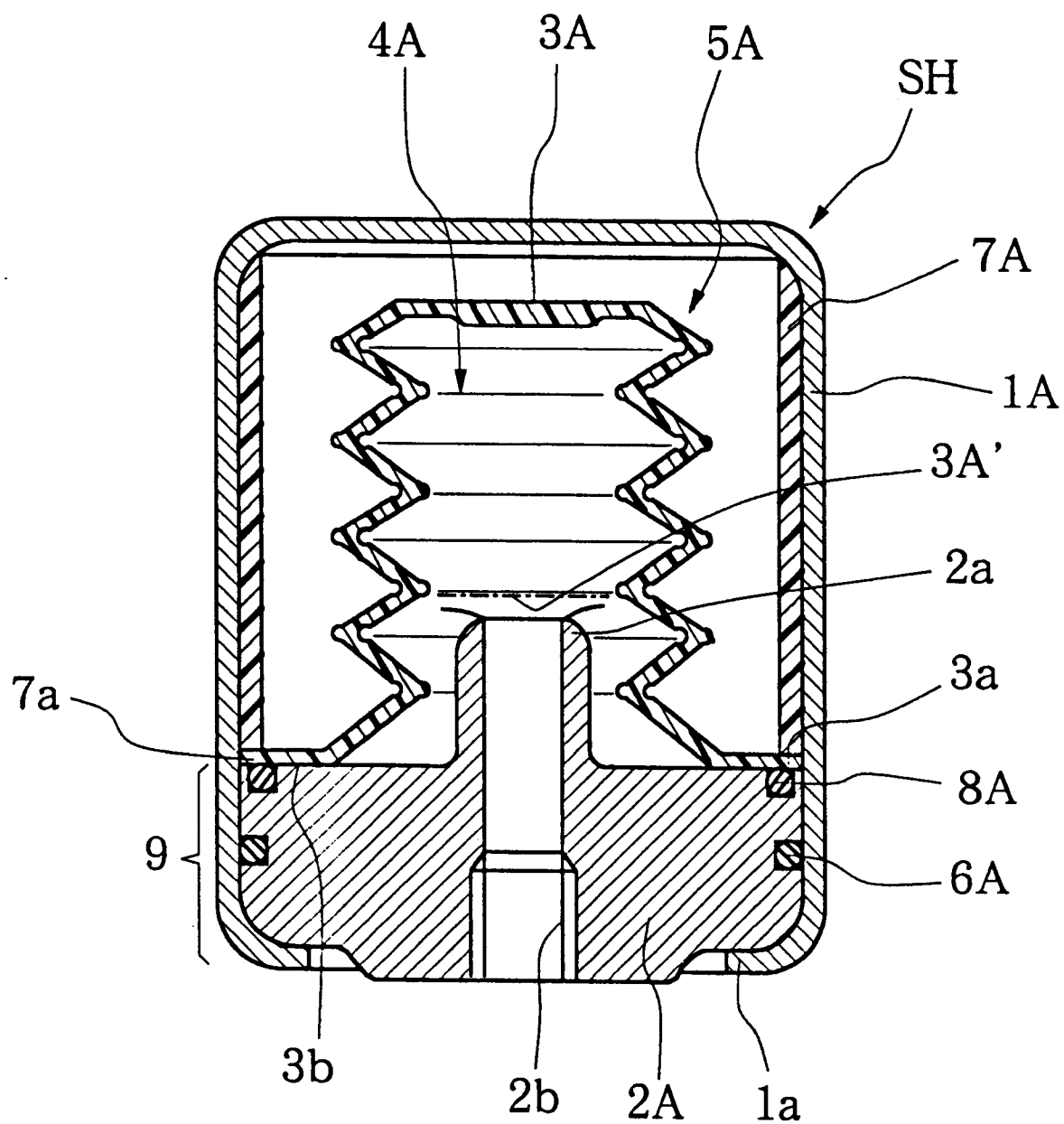
FIG. 1 is a longitudinal sectional view showing an accumulator according to a first embodiment of the present invention.

FIG. 1 is a longitudinal sectional view showing an accumulator according to Embodiment 1 of the present invention.

An internal space of the accumulator according to Embodiment 1 is formed by an outer shell (a first member of a shell) 1A and an end plate (a second member of a shell) 2A. A bellows type bladder 3A made of resin is expansibly mounted in the internal space of the accumulator. When the bladder 3A is mounted within the accumulator chamber as described above, the internal space of the accumulator is divided into a gas chamber 5A and a liquid chamber 4A. A joining surface 3b of the bladder 3A is pressed against an upper surface of the end plate 2A. A mounting portion 3a of the bladder 3A is held between a tubular collar 7A and the end plate 2A and is sealed by a seal member 8A such as an O-ring provided in a groove formed in the end plate 2A.

The collar 7A is pressed against the end plate 2A by an upper inner surface of the outer shell 1A when an open end 1a of the outer shell 1A is caulked and joined to the end plate 2A. With this, a contact surface 7a of the collar 7A presses the mounting portion 3a of the bladder 3A so as to secure a sealing performance of the joining surface 3b formed in the mounting portion 3a.

Figure 5:
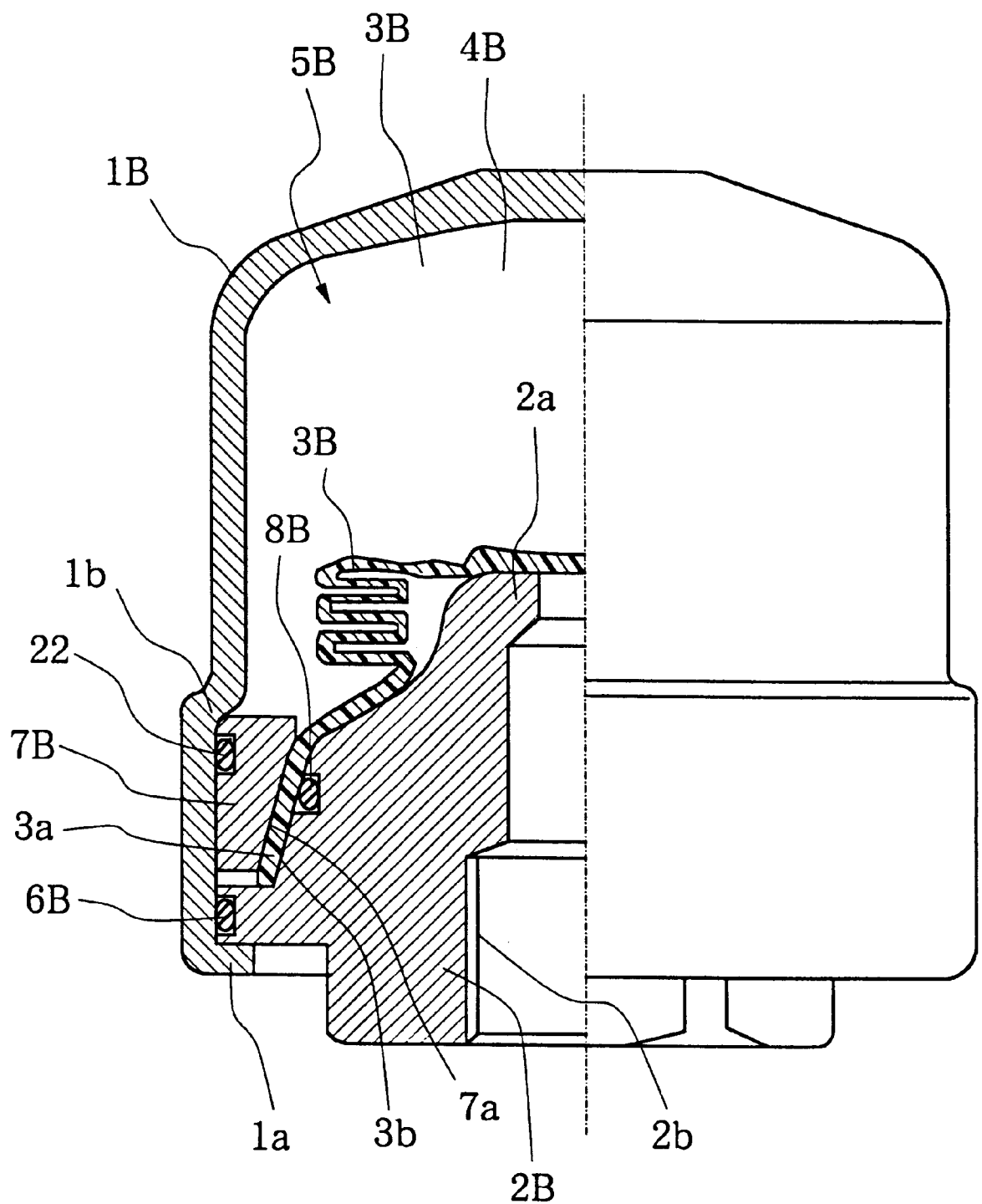
FIG. 5 is a longitudinal sectional view showing an accumulator according to a second embodiment of the present invention.

The shape of the bladder 3A shown by the solid line in FIG. 1 is the shape when the pressure of the gas chamber 5A is the same as that of the liquid chamber 4A. When the liquid chamber 4A has an atmosphere (one atmospheric pressure), the upper portion of the bladder 3A assumes a minimal compressed position shown by the dashed line 3A'. At this time, preferably, the gas chamber 5A has one atmospheric pressure or more. The shape of the bladder is similar to that of a bladder 3B as shown in FIG. 5.

While a material of the collar 7A is not particularly limited, an aluminum material or plastic may be employed to realize the reduction in weight. Further, in the case where the accumulator is used, for example, for a drinking-water system, the collar 7A is preferably formed of a synthetic resin such as polypropylene which poses no problem in health.

On the other hand, while a material of the bladder 3 is not also particularly limited, use can be made of a thermoplastic elastomer, ethylene vinyl alcohol and so forth which are rich in anti-gas permeability and operation durability. Particularly, if a liquid to be controlled is drinking water, it is preferable that ethylene vinyl alcohol or the like which poses no problem in health is used.

The end plate 2A is formed with a stopper 2a which extends toward the liquid chamber 4A to control a minimal compressed position of the bladder 3A. The end plate 2A is formed with a port 2b for introducing a liquid into the liquid chamber 4A. For example, a liquid pipe is connected to an internal thread portion of the port 2b whereby a liquid flowing through the pipe is guided to the liquid chamber 4A in response to the balance with the pressure of the gas chamber 5A.

While a material of the end plate 2A is not particularly limited, in the case where the accumulator is used, for example, for a drinking-water system, a synthetic resin such as polypropylene which poses no problem in health is preferably used.

The outer shell 1A is formed of closed-end tubular stainless steel, copper, copper alloy or the like. In order that the end plate 2A is joined to the outer shell 1A, the open end (caulking portion) 1a of the outer shell 1A is subjected to caulking process. In this case, a joining surface 9 between the outer shell 1A and the end plate 2A is not formed with a locating shoulder of the bladder 3A but of a simple cylindrical configuration. With this, workability and mass producibility are improved and thereby improvement in accuracy and reduction in cost can be attained. Moreover, not only the strength of the outer shell 1A but also the rigidity of the collar 7A contribute to the pressure in the gas chamber 5A. Therefore, even if the outer shell 1A is made thinner, sufficient compressive strength is obtained.

Further, in order to secure the sealing performance of the accumulator 2A formed by the outer shell 1A and the end plate 2A, a seal member 6A, for example, such as an O-ring, is interposed between the outer shell 1A and the end plate 2A.

As shown in FIG. 1, the outer shell 1A of the accumulator according to Embodiment 1 is not bored with a gas inlet hole for introducing gas into the gas chamber 5A.

In the fabrication of the accumulator, inert gases such as N2, CO2, Ar, He, etc., particularly CO2 or nitrogen gas, is introduced into the gas chamber 5A under a predetermined gas pressure using the process and apparatus described later.

Figure 2:
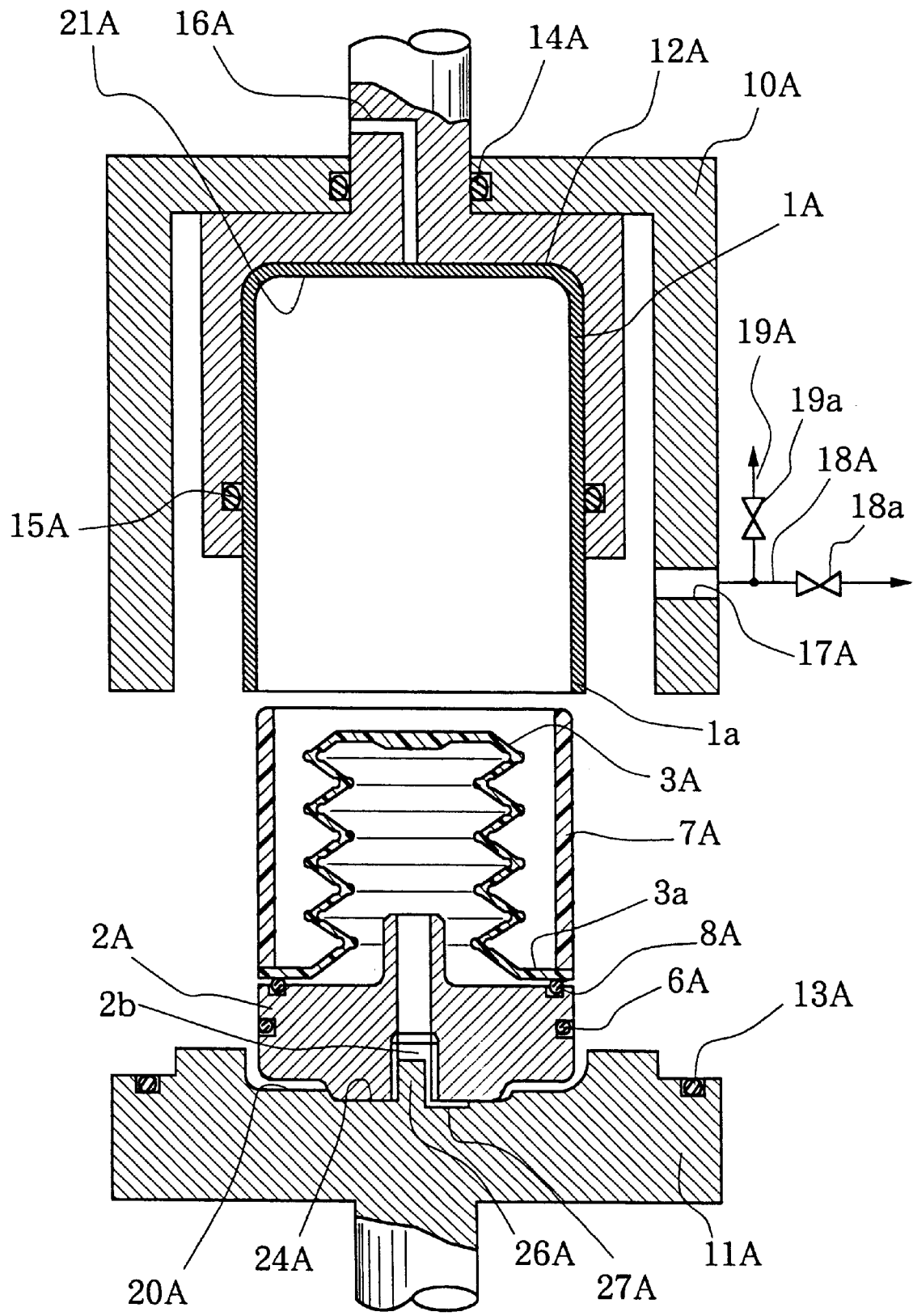
FIG. 2 is a sectional view showing a part set step of an assembling apparatus for the accumulator according to the first embodiment of the present invention.
Figure 3:
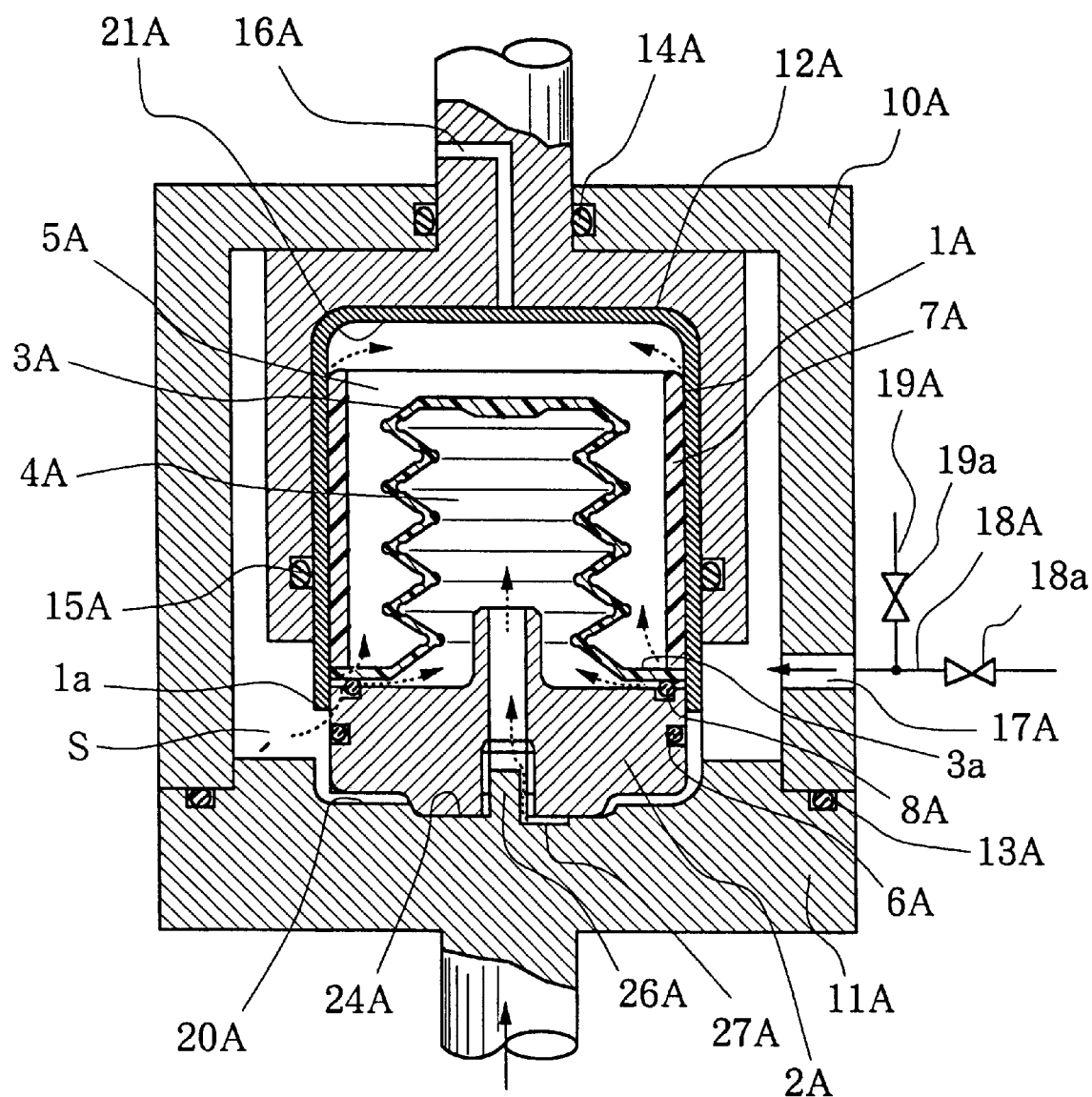
FIG. 3 is a sectional view showing a gas introducing step of the assembling apparatus for the accumulator according to the first embodiment of the present invention.
Figure 4:
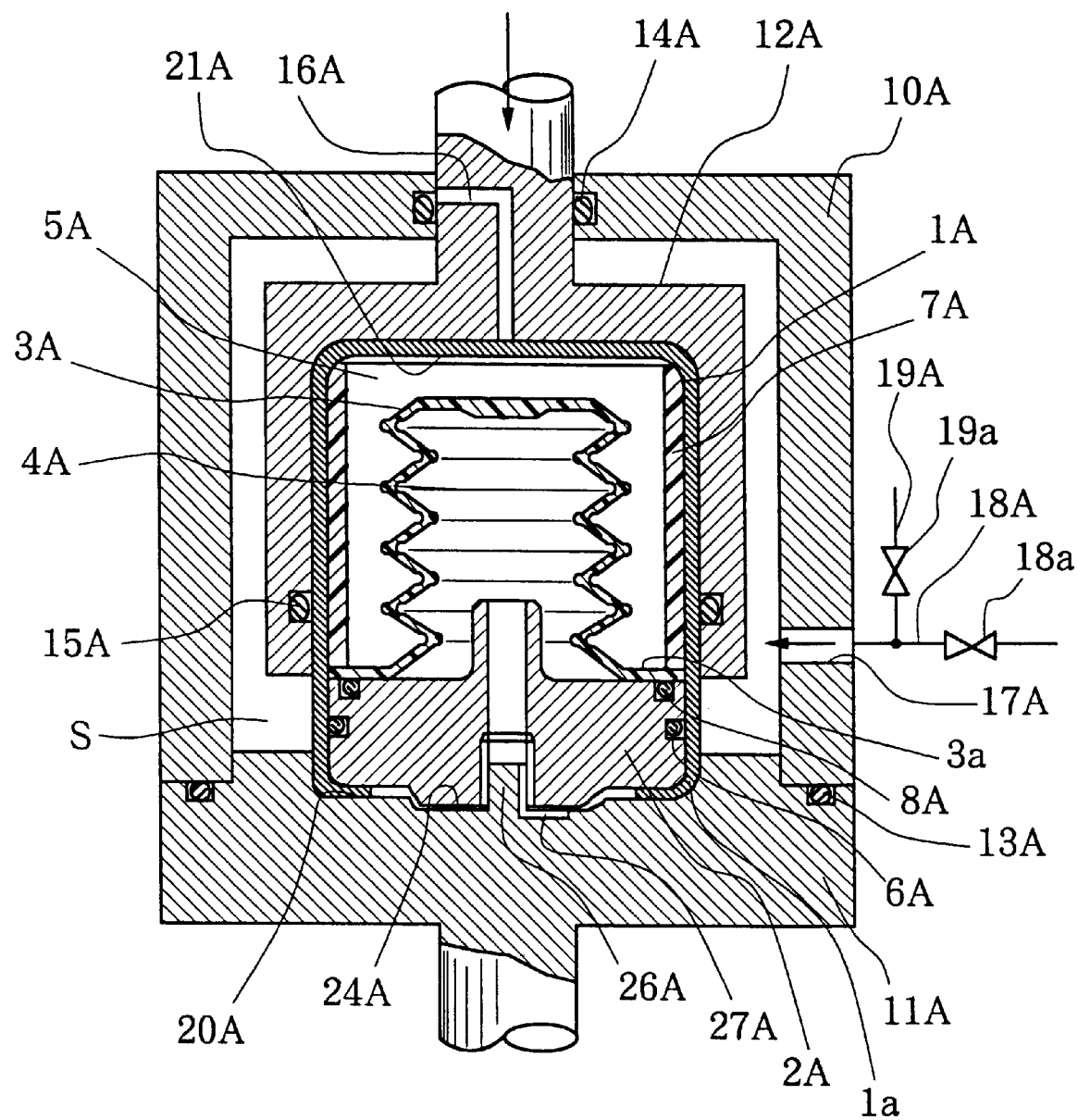
FIG. 4 is a sectional view showing a caulking step of the assembling apparatus for the accumulator according to the first embodiment of the present invention.

FIGS. 2 to 4 are respectively sectional views showing an apparatus for assembling the accumulator (FIG. 1) in Embodiment 1. Particularly, FIG. 2 shows a setting process of a plurality of parts, FIG. 4 shows a gas introducing step, and FIG. 3 shows a caulking step.

First, in the assembling apparatus for the accumulator in Embodiment 1, a first mold 11A is provided movably to and from a fixed type second mold 10A by means of a cylinder not shown. A frame 12A is provided on the second mold 10A.

The second mold 10A and the first mold 11A are united together to form a closed space S therein, as shown in FIG. 3 or FIG. 4. The sealing performance of the closed space S is secured by an O-ring 13A provided on the first mold 11A.

Further, within the closed space S formed by the two molds 10A and 11A, the frame 12A is provided movably to and from the first mold 11A by means of a fluid cylinder (not shown), as shown in FIGS. 3 and 4. In order to secure the sealing, performance of the closed space S, an O-ring 14A is interposed between the second mold 10A and the frame 12A.

On the other hand, the first mold 11A is formed on the upper surface thereof with a contact surface 24A adjusted to the shape of the end plate 2A of the accumulator and a protrusion 26A fitted to the port 2b of the end plate 2A, which serve as a locating function when the end plate 2 is placed on the first mold 11A. Further, the first mold 11A is formed on the upper surface thereof with a recess 20A adjusted to the shape of the open end 1a to be caulked of the outer shell 1A, the recess 20A constituting a caulking processing surface.

The frame 12A provided on the second mold 10A is formed with a recess 21A adjusted to the shape of the outer shell 1A. An O-ring 15A is mounted on the inner surface of the recess 21A. When the outer shell 1A is inserted into the recess 21A of the frame 12A, the outer shell 1A is held on the frame 12A by elasticity of the O-ring 15A. In FIGS. 2 to 4, a hole 16A has a function as an air vent hole when the outer shell 1A is inserted into the recess 21A of the frame 12A.

A gas delivery pipe 18A for gas to be introduced into the gas chamber 5A of the accumulator and a gas release pipe 19A are connected to a gas inlet hole 17A bored in the side wail of the second mold 10A. When gas is delivered into the closed space S, the release valve 19a is closed and the delivery valve 18a is opened. After the gas has been introduced into the gas chamber 5A, the release valve 19a is opened while the delivery valve 18a is closed in order to release the gas within the closed space S. These elements constitute a gas delivery means.

It is to be noted that the gas inlet hole 17A is not necessarily provided in the second mold 10A but may be provided in the first mold 11A.

Next, the procedure for assembling the accumulator according to the present invention will be described.

First, as shown in FIG. 2, the end plate 2A having the O-rings 6A and 8A mounted thereon is set to the first mold 11A. The bladder 3A is placed on the end plate 2A, after which the collar 7A is placed thereon. On the other hand, the outer shell 1A is inserted into the recess 21A of the frame 12A. In this case, the release valve 19a and the delivery valve 18a remain closed. The frame 12A is raised up to the top dead center with respect to the second mold 10A.

Subsequently, as shown in FIG. 3, the first mold 11A is moved close to the second mold 10A, and both the 10A and 11A are united. The closed space S is thus formed.

In this case, as the first mold 11A moves close to the second mold 10A, the collar 7A is first inserted into the outer shell 1A. A part of the end plate 2A is then inserted into the outer shell 1A. As a result, as shown in FIG. 3, the accumulator assumes a temporarily mounted state. However, since a slight clearance is present between the outer shell 1A and the end plate 2A, when the delivery valve 18A is opened to deliver the gas into the closed space S to increase the gas pressure to a predetermined level in such a temporarily mounted state, pressurized gas is introduced into the gas chamber 5A and the liquid chamber 4A through the clearance between the outer shell 1A and the end plate 2A. The pressurized gas is introduced into not only the gas chamber 5A but also the liquid chamber 4A. Thereby, when mounting, the bladder 3A is prevented from being collapsed. From a viewpoint of this, preferable a groove 27A for a flowpassage communicated with the port 2b of the end plate 2A is formed at a part of the contact surface 24A of the upper surface of the first mold 11A.

This condition is maintained for a time from the closure of the delivery valve 18a to the time when gas pressure of the gas chamber 5A reaches a reference value. Thereafter, as shown in FIG. 4, the frame 12A is moved down while uniting the second mold 10A and the first mold 11A. Thereby, the open end 1a of the outer shell 1A is caulked to the end plate 2A along the recess 20A formed in the first mold 11A whereby both the 1A and 2A are joined. At the same time, as the frame 12A moves down, the outer shell 1A presses the color 7A. Thereby, the lower end of the collar 7A causes the mounting portion 3a of the bladder 3A to press the end plate 2A.

After the introduction of the pressurized gas and the caulking joining have been done, the release valve 19a is opened to return the interior of the closed space S to a normal pressure. Further, the first mold 11A is moved down to remove the fabricated accumulator. At this time, since the liquid chamber 4A is at one atmospheric pressure, the bladder 3A is compressed by the pressure of the gas chamber 5A to assume a minimal compressed position. In this way, the accumulator is assembled and at the same time, gas at a predetermined pressure is introduced into the gas chamber 5A.

EMBODIMENT 2

Next, an accumulator according to Embodiment 2 of the present invention and an apparatus for assembling the same will be described.

FIG. 5 is a longitudinal sectional view showing an accumulator according to Embodiment 2 of the present invention.

An internal space of the accumulator according to Embodiment 2 is formed by an outer shell (a first member of a shell) 1B and an end plate (a second member of a shell) 2B. A bladder 3B which is made of resin and of a bellows type is expansibly mounted in the internal space of the accumulator. When the bladder 3B is mounted within the accumulator chamber, the internal space of the accumulator is divided into a gas chamber 5B and a liquid chamber 4B. A joining surface 3b of a mounting portion 3a is pressed against an upper surface of the end plate 2B. A mounting portion 3a of the bladder 3B is held between a tubular collar 7B (press member) 7B and an O-ring received in groove formed in the end plate 2B is provided to improve a collapse rate or improve a tension force when the bladder mounting portion 3a held between the collar 7B and the end plate 2B is deteriorated in sealing property due to a creep or the like.

The collar 7B of Embodiment 2 is formed to have a wedge-shape which becomes narrow in section downwardly in FIG. 5. A side wall of the end plate 2B of Embodiment 2 has a taper shape whose distal end has a large diameter corresponding to the wedge-like collar 7B.

When an open end (a caulking portion) 1a of the outer shell 1B is caulked and joined to the end plate 2B, the collar 7B is pressed toward the end plate 2B by a shoulder 1b formed on the outer shell 1B due to the wedge effect. Thereby, a contact surface 7a of the collar 7B presses the mounting portion 3a of the bladder to secure a sealing performance of the joining surface 3b of the bladder 3B.

Since the collar 7B and the mounting portion 3a of the bladder 3B is held between the outer shell 1B and the end plate 2B, pressure of gas within the gas chamber 5B acts in a direction of pushing down the collar 7B. Thereby, the mounting portion 3a of the bladder is firmly held between the collar 7B and the end plate 2B. Further, even if the mounting portion 3a of the bladder is pulled in a removing direction, the mounting portion 3 of the bladder is not slipped out due to the wedge effect of the collar 7B.

In FIG. 5, an element 22 is an O-ring which secures an airtightness between the outer shell 1B and the collar 7B.

While a material of the collar 7B is not particularly limited, an aluminum material or plastic may be employed to realize the reduction in weight. Further, in the case where the accumulator is used, for example, for a drinking-water system, the collar 7B is preferably formed of a synthetic resin such as polypropylene which poses no problem in health.

On the other hand, while a material of the bladder 3B is not also particularly limited, use can be made of a thermoplastic elastomer, ethylene glycol alcohol and so forth which are rich in anti-gas permeability and operation durability. Particularly, if a liquid to be controlled is drinking water, it is preferable that ethylene glycol alcohol or the like which poses no problem in health is used. A combination of several kinds of materials instead of one material can be also used.

The end plate 2B is formed with a stopper 2a which extends toward the liquid chamber 4B. The stopper 2a controls a minimal compressed position of the bladder 3B. The end plate 2B is formed with a port 2b for introducing a liquid into the liquid chamber 4B. For example, a liquid pipe is connected to an internal thread portion of the port 2b whereby a liquid flowing through the pipe is guided to the liquid chamber 4B in response to the balance with the pressure of the gas chamber 5B.

While a material of the end plate 2B is not particularly limited, in the case where the accumulator is used, for example, for a drinking-water system, a synthetic resin such as polypropylene which poses no problem in health is preferably used.

Figure 6:
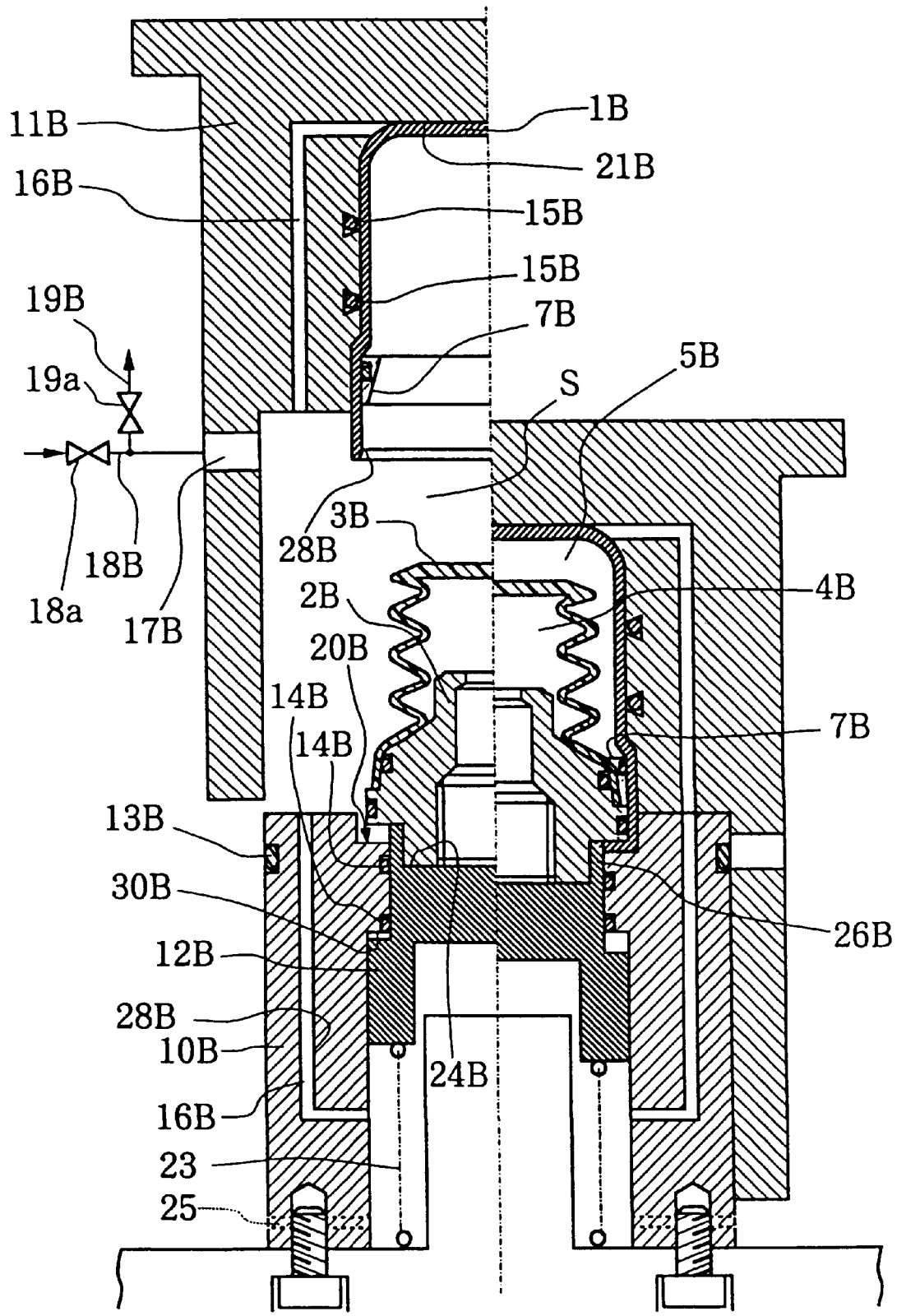
FIG. 6 is a sectional view showing an assembling apparatus of an accumulator according to the second embodiment of the present invention, a left half and a right half showing before-processing and during-processing, respectively.

The outer shell 1B is formed of closed-end tubular stainless steel, copper, copper alloy or the like. In order that the end plate 2B is joined to the outer shell 1B, the open end (caulking portion) 1a of the outer shell 1B is subjected to caulking process with respect to the end plate 2B. The open end 1a is formed in its inner surface with a tapered surface 28B so as not to interfere with the mounting portion 3a of the bladder, the end plate 2B, the O-ring 6B provided on the end plate 2B, etc. when the accumulator is assembled, as shown in FIG. 6.

Further, in order to secure, as a backup, the sealing performance of the accumulator formed by the outer shell 1B and the end plate 2B, a seal member 6B, for example, such as an O-ring, is interposed between the outer shell 1B and the end plate 2B.

As shown in FIG. 5, the outer shell 1B according to Embodiment 2 is not bored with a gas inlet hole for introducing gas into the gas chamber 5B.

However, in manufacturing the accumulator, gas such as nitrogen gas is introduced into the gas chamber 5B under a predetermined gas pressure. In Embodiment 2, the gas is introduced using an assembling apparatus and an assembling process for the accumulator described later.

FIG. 6 is a sectional view of an assembling apparatus for explaining the assembling process for the accumulator according to Embodiment 2, a left half showing a part setting step an a right half showing a gas introducing step and a caulking step.

First, the assembling apparatus for the accumulator according to Embodiment 2 will be described. A first mold 11B is provided movably to and from a fixed second mold 10B by means of a fluid cylinder not shown or the like. Further, the second mold 10B is formed with a frame 12B. The second mold 10B and the first mold 11B are formed with a closed space S therein at a portion before being united as shown in the right half of FIG. 6. The scaling performance of the closed space S is secured by an O-ring 13 provided on the second mold 10B.

The frame 12B is axially movably received in an axial hole 28B formed in the central portion of the second mold 10B. An upward movement of the frame 12B (FIG. 6) is limited by a shoulder 30B for a stopper formed in the axial hole 29B. To this frame 12B, a spring force is always applied upward in FIG. 6 by means of a spring 23. An O-ring 14B is interposed between the second mold 10B and the frame 12B to realize smooth sliding while preventing the frame 12B from sticking to the second mold 10B when the frame 12B is moved vertically.

While the spring 23 is biased upward in FIG. 6, a spring constant is selected so that even if the bladder 3B is pressed by the collar 7B, the frame 12B is not moved down, when the accumulator is mounted which will be described later. The spring constant is set so that as shown in the right half of FIG. 6, when the first mold 11B is moved closest to the second mold 10B and the caulking is finished, the frame 12B is moved down with respect to the second mold 10B. That is, let k be the spring constant of the spring and X be the stroke of the frame, then it is preferred that the spring 23 which satisfies the following formula be selected.

Thrust at termination of caulking >kX> thrust at initial time of caulking

The upper surface of the frame 12B is formed with a contact surface 24B and an annular protrusion 26B according to the shape of the end plate 2B of the accumulator as previously mentioned, which have a locating function when the end plate 2B is placed on the frame 12B. On the other hand, the upper surface of the second mold 10B located in the outer periphery of the annular protrusion 26B is formed with a recess 20B according to the shape of the open end 1a to be caulked of the outer shell 1B to constitute a caulking processing surface.

The first mold 11B is formed with a recess 21B according to the shape of the outer shell 1B, and an O-ring 15B is mounted on the inner surface of the recess 21B. When the outer shell 1B is inserted into the recess 21B of the first mold 11B, the outer shell 1B is held on the first mold 11B by the elasticity of the O-ring 15B.

In FIG. 6, an air vent hole 16B formed in the first mold 11B and the second mold 10B functions as an air vent hole when the outer shell 1B is inserted into the recess 21B of the first mold 1B. The air vent hole 16B further has a pressure equalization function such that when pressurized gas is introduced into the closed space S, the outer shell 1B is not excessively pressed within the recess 21B, and a pressure equalization function such that the frame 12B is not moved down under gas pressure.

A gas delivery pipe 18B for introducing gas into the gas chamber 5B of the accumulator and a gas release pipe 19B are connected to a gas inlet hole 17B bored in the first mold 11B. When gas is delivered into the closed space S, a release valve 19a is closed and a delivery valve 18a is opened. After the gas has been introduced into the gas chamber 5B, the release valve 19a is opened while the delivery valve 18a is closed in order to release the gas within the closed space S. These elements constitute gas delivery means of the present invention.

Further, the second mold 10B is provided with a gas vent hole 25 for removing the gas within the closed space S when the caulking downward movement is completed.

It is to be noted in the present invention that the gas inlet hole 17B is not necessarily provided in the first mold 11B but it may be provided in the second mold 10B.

Next, the procedure for assembling the accumulator according to Embodiment 2 will be described.

First, as shown in the left half of FIG. 6, the end plate 2B having the O-rings 6B and 8B mounted thereon is located and set to the upper portion of the frame 12B, and the bladder 3B is placed on the end plate 2B. On the other hand, the collar 7B is incorporated into the outer shell 1B and inserted into the recess 21B of the first mold 11b. In this case, the release valve 19a and the delivery valve 18a remain closed, and the first mold 11B is moved upward to the top dead center with respect to the second mold 10B.

Next, the first mold 11B is moved close to the second mold 10B, and both the 10B and 11B are united to thereby form a closed space S therein.

In this case, as the first mold 11B is moved close to the second mold 10B, the closed space S is first formed by the first mold 11B and the second mold 10B through the O-ring 13B. The delivers valve 18a is opened to deliver the gas into the closed space S and the gas pressure is increased to a predetermined level. Let P1 be the gas pressure to be supplied, P2 be the set pressure of the accumulator, V1 be the volume of the closed space when gas is supplied, and V2 be the volume of the closed space S when clamping is completely made. Then, the gas pressure is given by the following formula.

$$P1 = P2 \times V2/V1$$

Here, when the accumulator is removed after it has been assembled, atmosphere enters through a port, and therefore, the bladder is compressed to assume a minimal compressed state shown in FIG. 5. Accordingly, let v1 be the gas volume before the bladder is compressed, and v2 be the volume after compressed. Then, the actual pressure P3 of the accumulator is given by the following formula.

$$P3 = P2 \times V1/V2$$

The initial value of the pressured gas is determined while taking this into consideration. For example, it is preferred that gas pressure of the gas chamber 5B in atmosphere be set above one atmospheric pressure.

When the first mold 11B is moved down, the open end 1a of the outer shell 1B is inserted into the end plate 2B. When further moving down, the open end 1a of the outer shell 1B is caulked by the end plate 2B by the recess 20B formed in the second mold 10B, and both the 1B and 2B are united. At the same time, the collar 7B causes the mounting portion 3a of the bladder 3B to press against the end plate 2b.

When the first mold 11B comes into contact with the second mold 10B, the frame 12B is slightly moved down against the force of the spring 23 through the collar 7B pressed by the shoulder 1b of the outer shell 1B.

In this way, after the introduction of gas and caulking joining have been carried out, the release valve 19a and the gas vent hole 25 are opened to return the interior of the closed space S to a normal pressure. After the first mold 11B has been moved upward, the assembled accumulator is removed. At this time, in order to completely perform the gas vent between the outer shell 1B and the first mold 11B, it is desirable that the air vent holes 16B and 16B formed in the first mold 11B and the second mold 10B, respectively, are in registration with each other. Further, if a plurality of O-rings 15B provided in the recess 21B of the first mold 11B are present, it is desirable that air vent holes for performing the gas vent between the O-rings 15B and 15B are provided separately.

EMBODIMENT 3

Next, the assembling apparatus for the accumulator according to Embodiment 3 of the present invention will be described.

Figure 7:
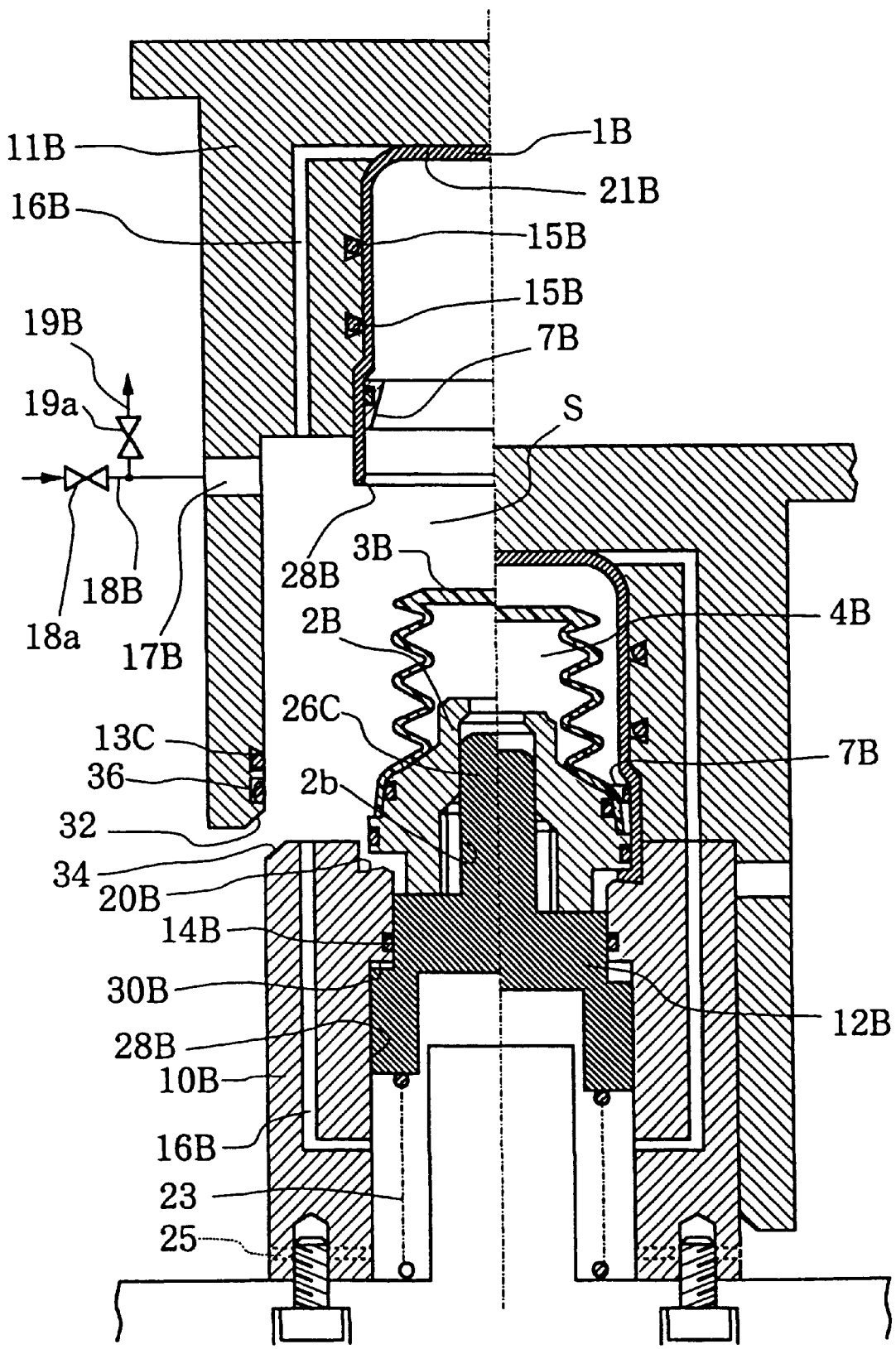
FIG. 7 is a sectional view showing an assembling apparatus of an accumulator according to a third embodiment of the present invention, a left half and a right half showing before-processing and during-processing, respectively.

The assembling apparatus for the accumulator shown in FIG. 7 according to Embodiment 3 is an improvement over that shown in FIG. 6. Members in FIG. 7 common to those shown in FIG. 6 are indicated by common reference numerals, description of which is partly omitted.

In the assembling apparatus for the accumulator according to Embodiment 3, as shown in FIG. 7, a rod-like protrusion 26C is formed in the upper central portion of the frame 12B without forming the locating annular protrusion 26B in the upper outer periphery of the frame 12B. The rod-like protrusion 26C is inserted into the port 2b of the end plate 2B, whereby the end plate 2B is centered with respect to the frame 12B and located.

In Embodiment 3, it is not necessary to form the thin annular protrusion 26B so that the fabrication of the assembling apparatus is very easy as compared with the embodiment shown in FIG. 6. For example, the rod-like protrusion 26C can be easily molded integrally with the frame 12B. Alternatively, the rod-like protrusion 26C is molded separately from the frame 12B and can be easily mounted by screwing with respect to the frame 12B.

Further, in Embodiment 3, it is not necessary to locate the end plate 2B by the annular protrusion 26B, and therefore, a freedom of the end peripheral shape of the end plate 2B increases as compared with the embodiment shown in FIG. 6. For example, since the locating is allowed to be carried out by the port 2b, it is not necessary to enhance the accuracy of the end outer peripheral surface of the end plate 2B adjusting to the accuracy of the inner peripheral surface of the annular protrusion 26B.

Figure 8:
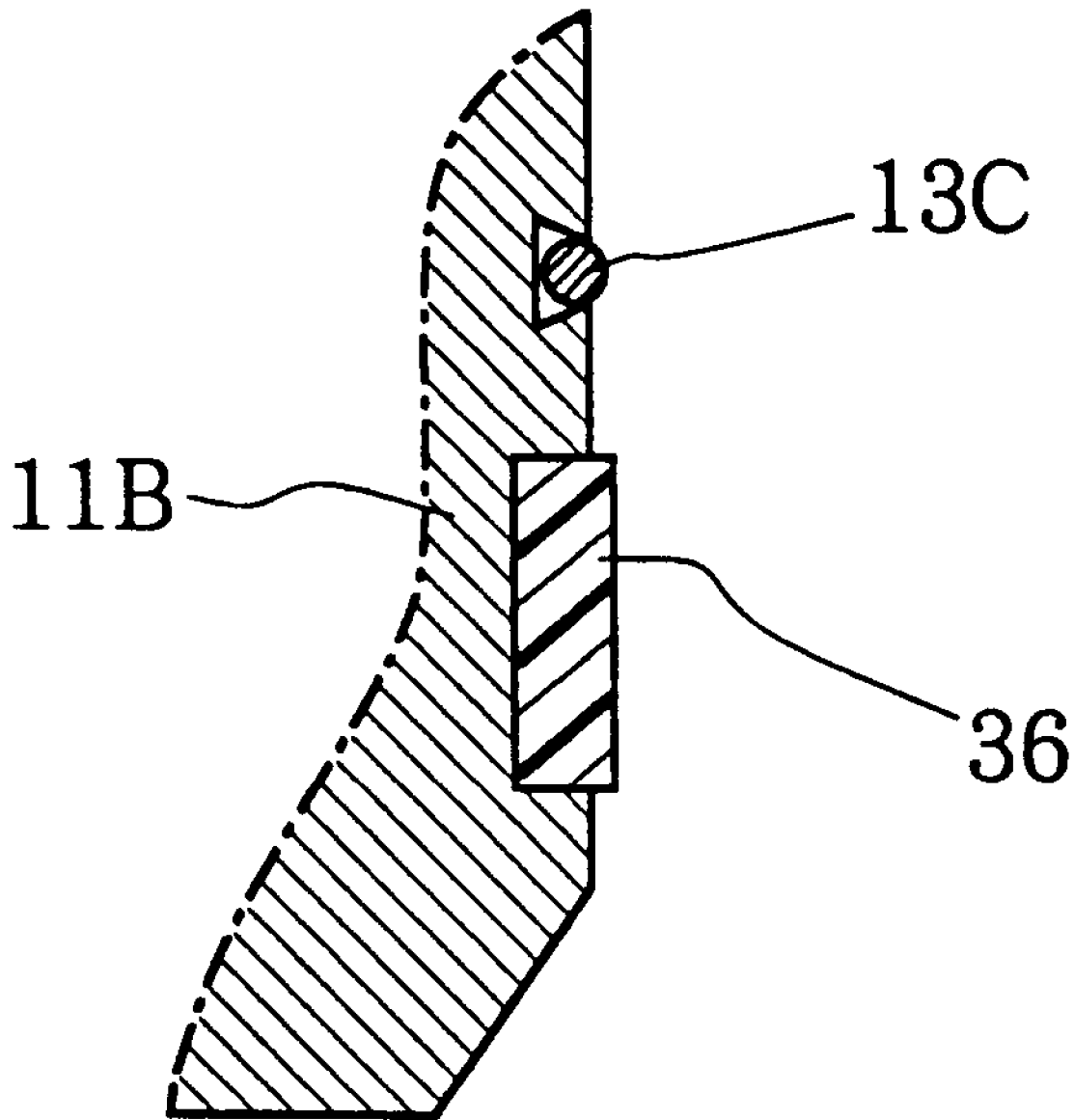
FIG. 8 is a schematic sectional view showing essential parts of the assembling apparatus shown in FIG. 7.

Other improvements in connection with the assembling apparatus for the accumulator according to Embodiment 3 will be mentioned. An inner peripheral surface at the lower end of the first mold 11B and an upper peripheral surface at the outer end of the second mold 10B are formed with tapered portions 32 and 34, respectively, and an O-ring 13C as a seal member of a uniting surface thereof can be mounted on the inner peripheral surface of the first mold 11B. A sliding ring 36 can be mounted on the uniting surface in the inner periphery of the first mold 11B as shown in FIGS. 7 and 8. As the sliding ring 36, for example, a fluorine plastic ring which is excellent in sliding properties can be used.

The formation of the tapered portions 32 and 34 can prevent the seal surface which is the uniting surface from being scratched when the first mold 11B and the second mold 10B are combined. Further, the mounting of the sliding ring 36 on the uniting surface between the first mold 11B and the second mold 10B can maintain a sufficient clearance between these uniting surfaces. Also, in this respect, it is possible to prevent the uniting surface which is the seal surface from being scratched. The seal between these uniting surfaces can be maintained well by the O-ring 13C mounted on the uniting surface of the first mold 11B. As a result, the positive sealability of the closed space S can be obtained in the state where the first mold 11B and the second mold 10B are combined. If the O-ring 13C is mounted on the uniting surface of the first mold 11B, it is not necessary to mount the O-ring on the uniting surface of the second mold 10B.

EMBODIMENT 4

Next, the assembling apparatus for the accumulator (FIG. 9) according to Embodiment 4 of the present invention will be described.

The assembling apparatus for the accumulator according to Embodiment 4 is an improvement over that shown in FIG. 7.

Figure 9:
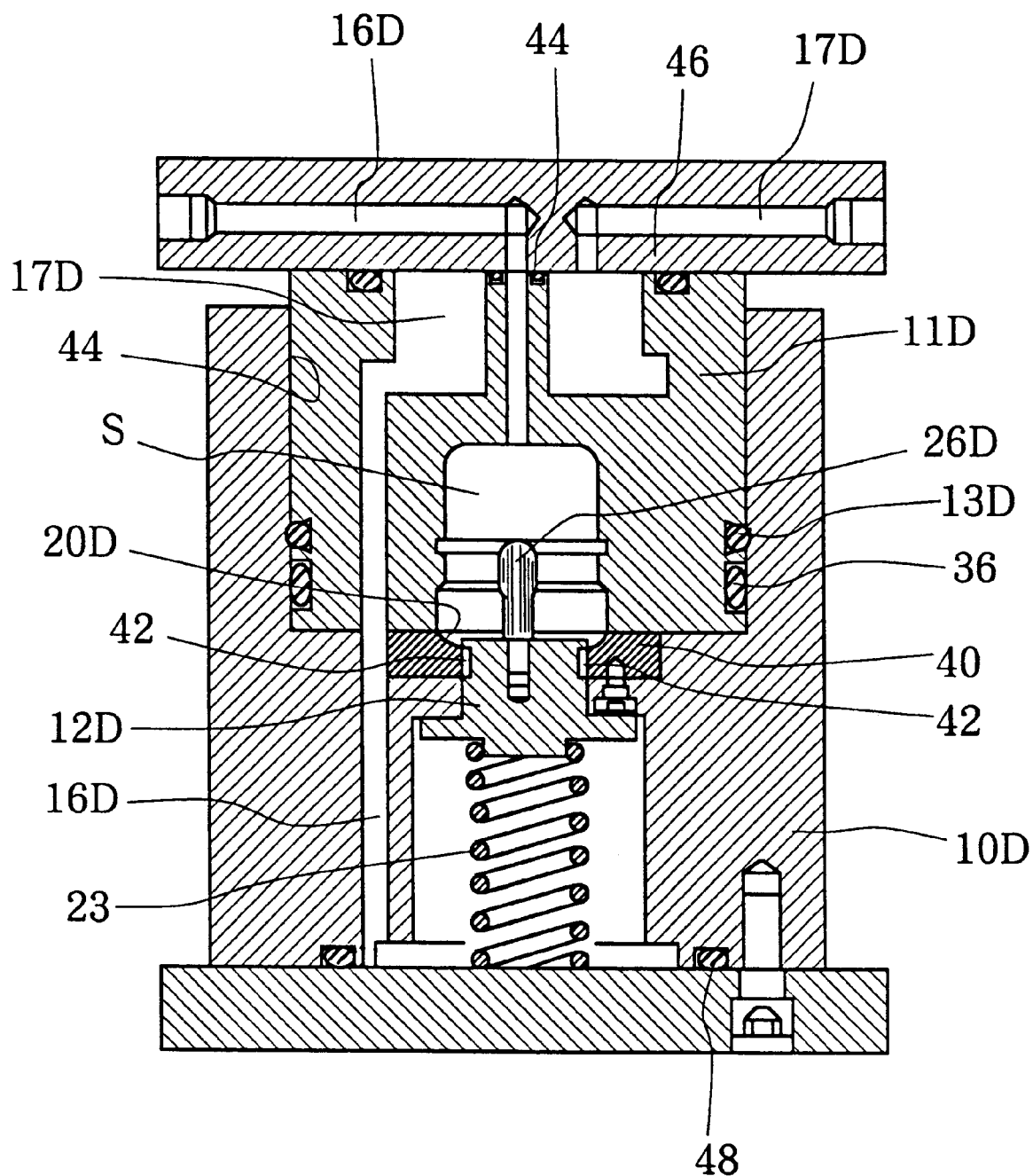
FIG. 9 is a sectional view showing an assembling apparatus of an accumulator according to a fourth embodiment of the present invention.

The assembling apparatus for the accumulator according to Embodiment 4 is greatly different from the former in that as shown in FIG. 9, a part 40 formed with a recess 20D constituting a caulking processing surface is detachable from a second mold 10D.

The specific construction of a first mold 11D, a second mold 10D, a frame 12D and a rod-like protrusion 26D is apparently different from that of the embodiment shown in FIG. 7 but is substantially similar thereto in terms of function. In Embodiment 4, the first mold 11D is inserted into the combining recess formed at the upper part of the second mold 10D to form the closed space S. Accordingly, the uniting surface which is the seal surface is formed in the outer peripheral surface of the first mold 11D, and an O-ring 13D and a sliding ring 36 are mounted thereon.

A gas having a predetermined pressure is introduced into the closed space S through a gas inlet hole 17D formed in the first mold 11D. The first mold 11D and the second mold 10D are formed with an air vent hole 16D corresponding to the air vent hole 16B shown in FIG. 7.

In FIG. 9, reference numeral 42 designates a sliding ring in order that the frame 12D may be easily slidably moved with respect to the part 40 and the second mold 10D. Reference numerals 44, 46 and 48 designate O-rings.

In Embodiment 4, the part 40 formed with the recess 20D which is the caulking processing surface is of a cartridge type which is detachable with respect to the second mold 10D. Therefore, when the recess 20D which is the caulking processing surface is worn, it can be easily replaced. It is not necessary to replace the whole mold.

EMBODIMENT 5

Next, the accumulator according to Embodiment 5 of the present invention will be described.

Figure 10:
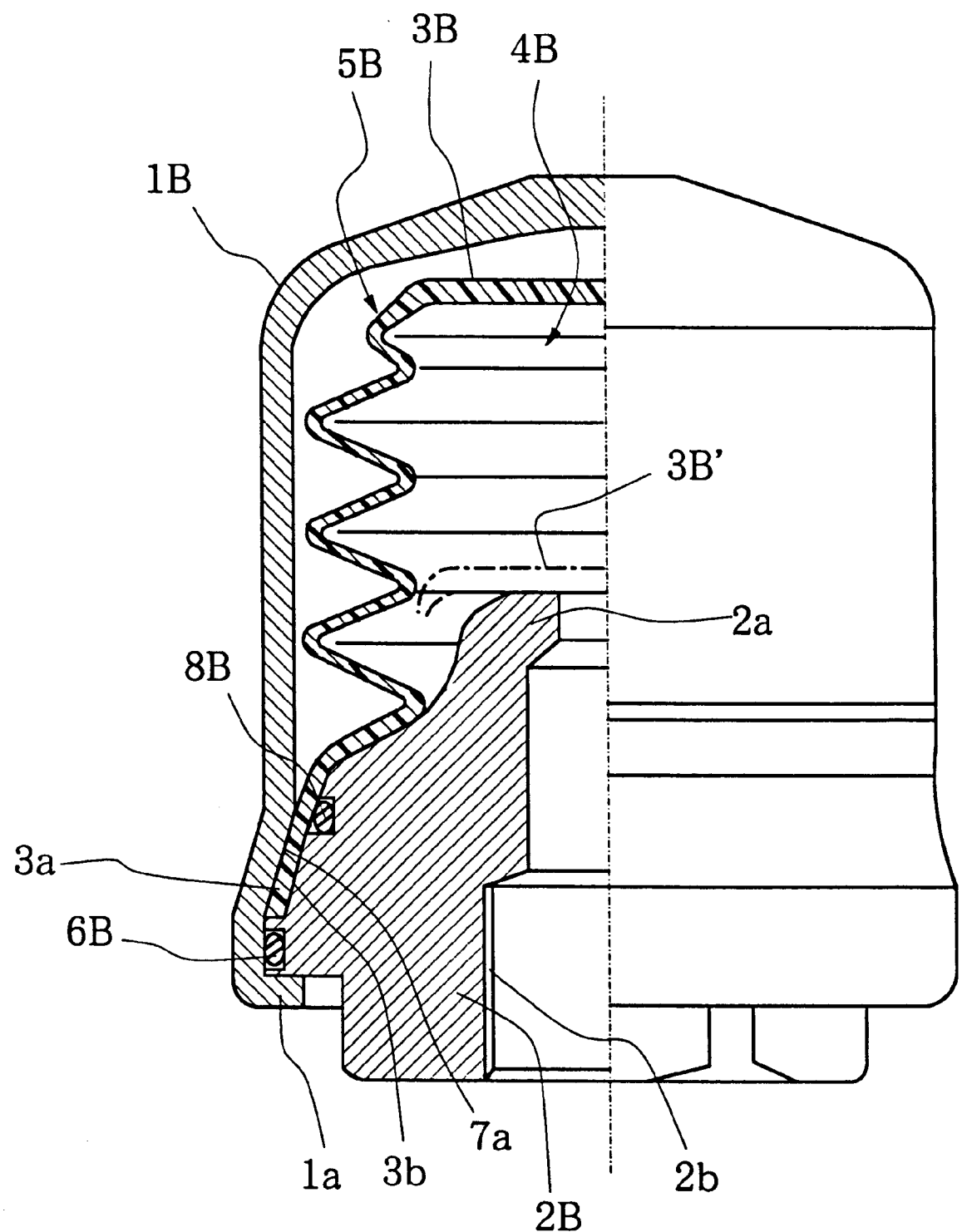
FIG. 10 is a longitudinal sectional view showing an accumulator according to a fifth embodiment of the present invention.

FIG. 10 is a longitudinal sectional view showing an accumulator according to Embodiment 5 of the present invention. In the accumulator shown in Embodiment 5, the collar 7B of Embodiment 5 (FIG. 5) is omitted. In FIG. 10, members common to those shown in FIG. 5 are indicated by reference numerals common thereto, description of which is partly omitted.

The internal space of the accumulator according to Embodiment 5 is formed by an outer shell (a first member of a shell) 1B and an end plate (a second member of a shell) 2B. A bladder 3B which is made of resin and of a bellows type is expansibly mounted within the internal space of the accumulator. When the bladder 3B is mounted within the internal space of the accumulator, the internal space of the accumulator is divided into a gas chamber 5B and a liquid chamber 4B. A joining surface 3b of a mounting portion 3a of the bladder 3B is pressed against the side of the end plate 2B. The mounting portion 3a of the bladder 3B is held between the outer shell (a pressing member) 1B and the end plate 2B. An O-ring received in a groove formed in the end plate 2B or the like is provided to improve a collapse rate or improve a tension force when the bladder mounting portion 3a held therebetween is deteriorated in sealability due to a creep or the like.

The side wall of the end plate 2B in Embodiment 5 has a tapered shape whose distal end is large in diameter corresponding to the outer shell 1B.

The contact surface of the outer shell 1B presses the mounting portion 3a of the bladder 3B to secure a sealing performance of the joining surface 3b of the bladder 3B.

The mounting portion 3a of the bladder 3B is held between the outer shell 1B and the end plate 2B to act in a direction to be pressed against the end plate 2B by pressure of gas within the gas chamber 5B.

The end plate 2B is formed with a stopper 2a which extrudes toward the liquid chamber 4B. The stopper 2a controls a minimal compressed position of the bladder 3B. Therefore, when the port 2b of the end plate 2B is communicated with atmosphere, the upper portion of the bladder 3B is at a minimal compressed position indicated by the dashed line 3B' and has a shape similar to the bladder 3B shown in FIG. 5.

The outer shell 1B is made of a closed-end tubular stainless steel, copper, copper alloy or the like, for example. In order to join the end plate 2B to the outer shell 1B, the open end (caulking portion) 1a of the outer shell 1B is subjected to caulking processing with respect to the end plate 2B.

In order to backup the sealing performance of the internal space of the accumulator formed by the outer shell 1B and the end plate 2B, a seal member 6B, for example, such as an O-ring, is interposed between the outer shell 1B and the end plate 2B.

As shown in FIG. 10, the outer shell according to Embodiment 5 is neither bored with a gas inlet hole for introducing gas into the gas chamber 5B.

In the fabrication of the accumulator, gas such as nitrogen gas is enclosed into the gas chamber 5B under a predetermined gas pressure. The gas can be enclosed into the accumulator of Embodiment 5 (FIG. 10) by assembling process and assembling apparatus which are improvements (for example, Embodiment 7 of FIG. 12) over those of Embodiment 2 (FIGS. 6 to 9) shown in FIG. 5.

EMBODIMENT 6

Figure 11:
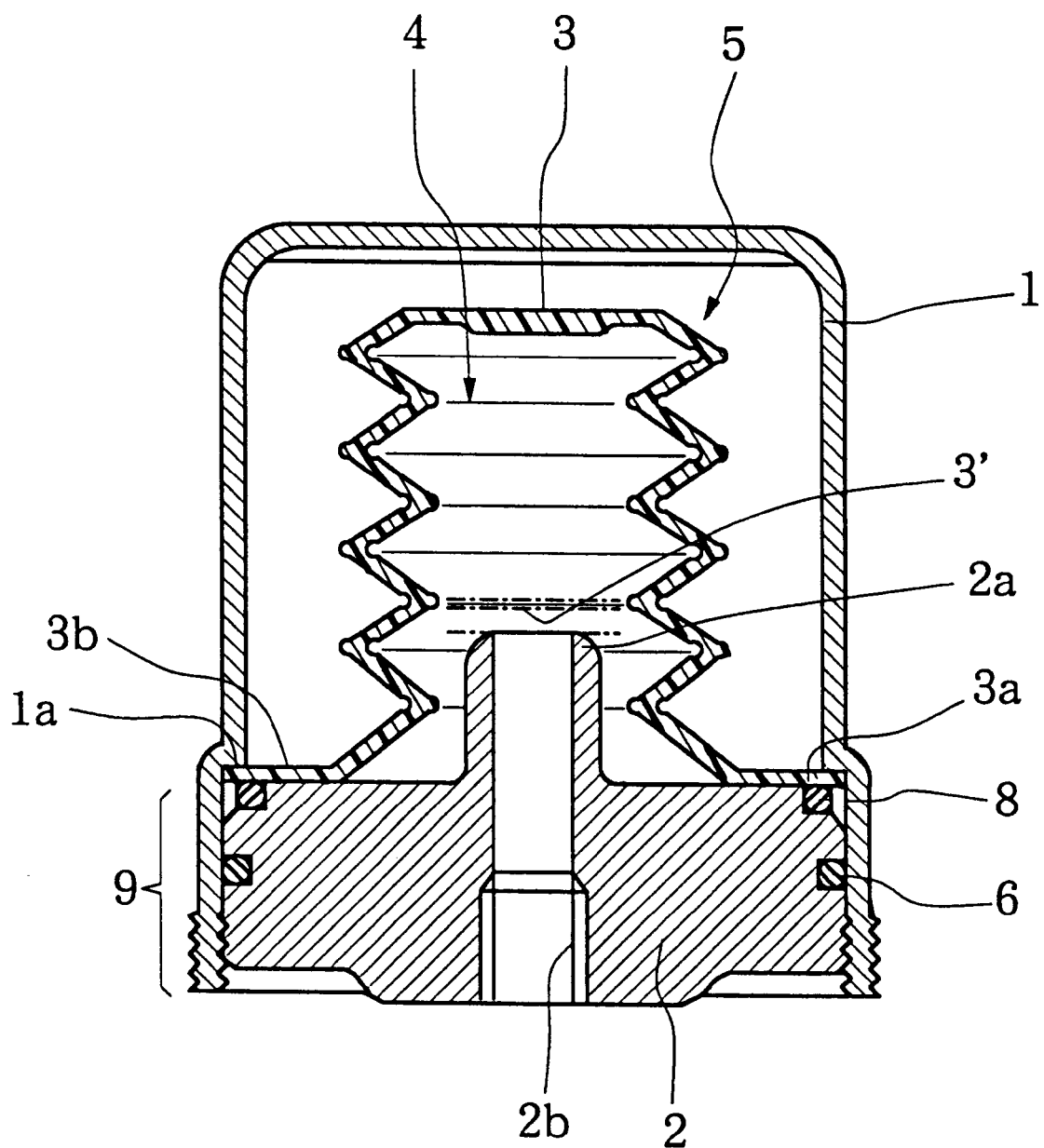
FIG. 11 is a sectional view showing an accumulator according to a sixth embodiment of the present invention.

FIG. 11 is a longitudinal sectional view showing an accumulator according to Embodiment 6 of the present invention.

An internal space of the accumulator according to Embodiment 6 is formed by an outer shell (a first member of a shell) 1 and an end plate (a second member of a shell) 2. A bellows type bladder 3 made of resin is expansibly mounted in the internal space of the accumulator. When the bladder 3 is mounted within the accumulator chamber as described above, the internal space of the accumulator is divided into a gas chamber 5 and a liquid chamber 4. A joining surface 3b of the bladder 3 is pressed against an upper surface of the end plate 2. A mounting portion 3a of the bladder 3 is held between a shoulder 1a and the end plate 2A and is sealed by a seal member 8 such as an O-ring provided in a groove formed in the end plate 2.

When an open end of the outer shell 1 is screwed and joined to the end plate 2, the shoulder 1a of the outer shell 1 is pressed by the end plate 2. With this, the shoulder 1a presses the mounting portion 3a of the bladder 3 so as to secure a sealing performance of the mounting portion 3a.

The shape of the bladder 3 shown by the solid line in FIG. 11 is the shape when the pressure of the gas chamber 5 is the same as that of the liquid chamber 4. When the liquid chamber 4 has an atmosphere (one atmospheric pressure), the upper portion of the bladder 3 assumes a minimal compressed position shown by the dashed line 3'. At this time, preferably, the gas chamber 5 has one atmospheric pressure or more. The shape of the bladder 3 is similar to that of a bladder 3B as shown in FIG. 5.

The end plate 2 is formed with a stopper 2a which extrudes toward the liquid chamber 4 to control a minimal compressed position of the bladder 3. The end plate 2 is formed with a port 2b for introducing a liquid into the liquid chamber 4. For example, a liquid pipe is connected to an internal thread portion of the port 2b whereby a liquid flowing through the pipe is guided to the liquid chamber 4 in response to the balance with the pressure of the gas chamber 5.

The outer shell 1 is formed of closed-end tubular stainless steel, copper, copper alloy or the like. In order that the end plate 2 is joined to the outer shell 1, the open end of the outer shell 1 is formed with internal threads. The end plate 2 is formed in its outer periphery with external threads correspondingly. In this case, a joining surface 9 between the outer shell 1 and the end plate 2 is of a simple cylindrical configuration following the locating shoulder 1a of the bladder 3. With this, workability and mass producibility and improved and thereby improvement in accuracy and reduction in cost can be attained.

Further, in order to secure the sealing performance of the accumulator chamber formed by the outer shell 1 and the end plate 2, a seal member 6, for example, such as an O-ring, is interposed between the outer shell 1 and the end plate 2.

As shown in FIG. 11, the outer shell 1A of the accumulator according to Embodiment 6 is not bored with a gas inlet hole for enclosing gas into the gas chamber 5.

EMBODIMENT 7

Figure 12:
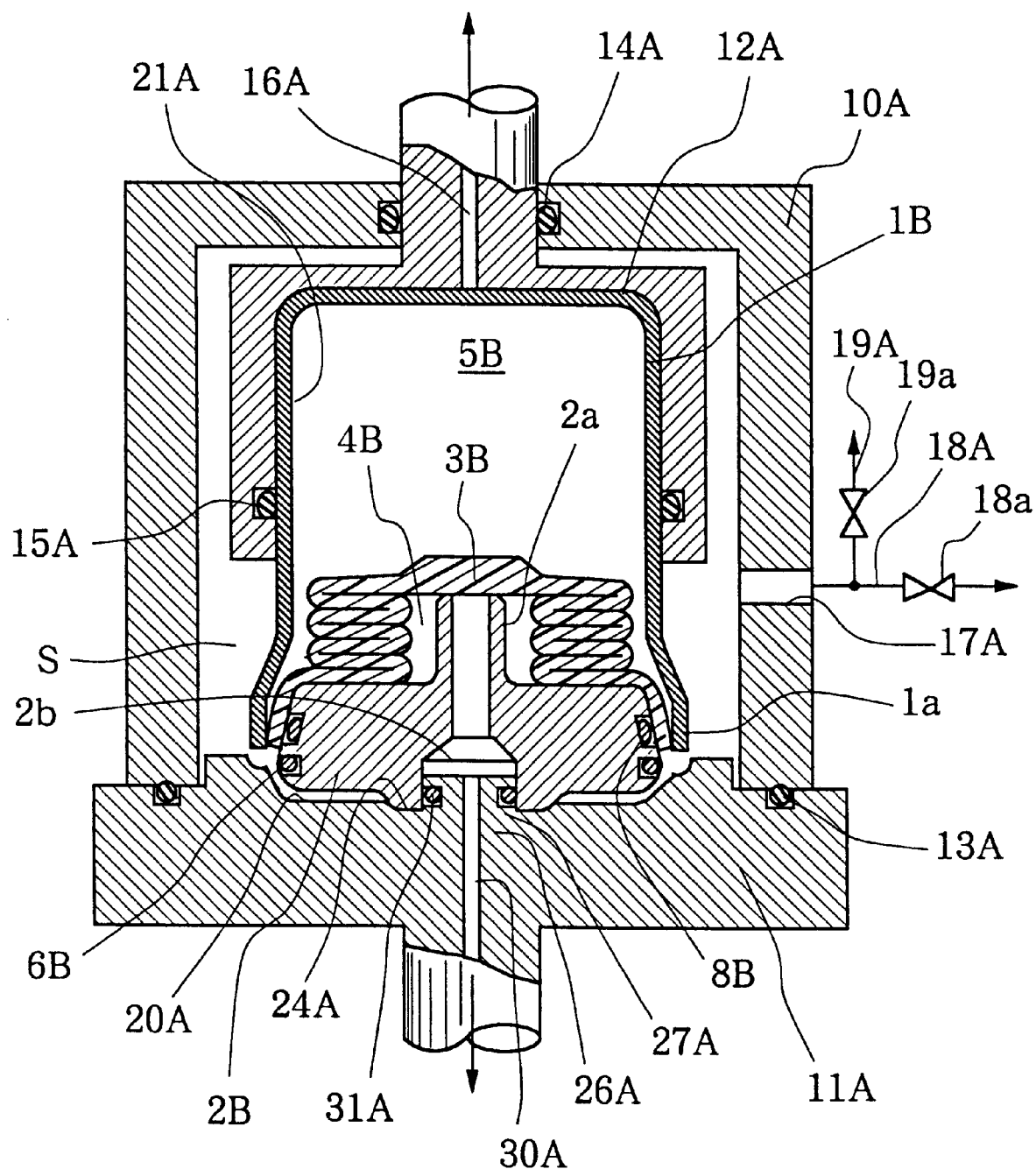
FIG. 12 is a sectional view showing an assembling apparatus of an accumulator according to a seventh embodiment of the present invention.

FIG. 12 is a sectional view showing one example of an apparatus for assembling the accumulator (FIG. 1) of FIG. 10.

First, in the assembling apparatus for the accumulator according to Embodiment 7, a first mold 11A is provided movably to and from a fixed type second mold 10A by a cylinder or the like not shown, as shown in FIG. 12. A frame 12A is provided within the second mold 10A.

The second mold 10A and the first mold 11A are united each other to thereby form a closed space S therein, as shown in FIG. 12. The sealing performance of the closed space S is secured by an O-ring 13A provided in a groove of the upper surface of the first mold 11A.

Within the closed space S formed by two molds 10A and 11A, the frame 12A is provided movably to and from the first mold 11A by a fluid cylinder or the like (not shown). An O-ring 14A is interposed between the second mold 10A and the frame 12A in order to secure the sealing performance of the closed space S.

On the other hand, the upper surface of the first mold 11a is formed with a contact surface 24A adjusted to the shape of an end plate 2B of the accumulator and a protrusion 26A fitted to a port 2b of the end plate 2B. These have a locating function when the end plate 2B is placed on the first mold 11A. The upper surface of the first mold 11A is formed with a recess 20A according to the shape of the open end 1a to be caulked of the outer shell 1B to constitute a caulking processing surface, as shown in FIG. 12.

The frame 12A movably provided on the second mold 10A is formed with a recess 21A according to the shape of the outer shell 1B. An O-ring 15A is mounted on the inner surface of the recess 21A. When the outer shell 1B is inserted into the recess 21A of the frame 12A, the outer shell 1B is held on the frame 12A due to the elasticity of the O-ring 15A.

A hole 16A is formed in a shaft portion of the frame 12A and has a function as an air vent hole when the outer shell 1B is inserted into the recess 21A of the frame 12A. This hole can be connected to a vacuum means to render negative pressure.

A gas delivery pipe 18A for introducing gas into the gas chamber 5A of the accumulator and a gas release pipe 19A are connected to a gas inlet hole 17A bored in the side wall of the second mold 10A. When the was is delivered into the closed space S, the release valve 19a is closed and the delivers valve 18a is opened. After the gas has been introduced into the gas chamber 5B, the release valve 19a is opened while the delivery valve 18a is closed to release the gas within the closed space S. These elements constitute a gas delivery means.

The gas inlet hole 17A is not necessarily provided in the second mold 10A but may be provided in the first mold 11A.

The shaft portion of the first mold 11A is formed with a hole 30A for communication between a liquid chamber 4B and a vacuum means (not shown). Further, a seal member 31A is provided on the first mold 11A in order to form a seal between the shaft portion of the first mold 11A and the end plate 2B.

Next, the procedure for assembling the accumulator according to Embodiment 7 of the present invention.

First, the end plate 2B having the O-rings 6B and 8B mounted thereon in advance is set to the first mold 11A, as shown in FIG. 12. After the bladder 3B has been placed on the end plate 2B, the vacuum means is operated to render the liquid chamber 4B negative pressure through the hole 30A. Thereby, the bladder 3B assumes a minimal compressed state.

On the other hand, the outer shell 1B is inserted into the recess 21A of the frame 12A. In this case, the release valve 19a and the delivery valve 18a are closed. The frame 12A is moved upward to the top dead center with respect to the second mold 10A.

Then, the first mold 11A is moved close to the second mold 10A, and both the 10A and 11A are united. Thereby, the closed space S is formed by both the molds 10A and 11A.

When the first mold 11A is moved close to the second mold 10A, a clearance is present between the outer shell 1B and the end plate 2B till the lower portion of the end plate 2B comes into contact with the outer shell 1B. Therefore, in this condition, when the delivery valve 18A is opened to supply the gas into the closed space S to increase a gas pressure to a predetermined level, pressured gas is introduced into the gas chamber 5B through the clearance between the outer shell 1B and the end plate 2B. The gas is introduced into only the gas chamber 5A not into the liquid chamber 4A.

This condition is maintained from the closure of the delivery valve 18a to the time when the gas pressure of the gas chamber 5B reaches a reference value.

Thereafter, the frame 12A is moved down to a predetermined position in the state where the second mold 10A and the first mold 11A are united. Thereby, the open end 1a of the outer shell 1B is caulked to the end plate 2B along the recess 20A formed in the first mold 11A whereby both the 1B and 2B are joined.

As the frame 12A moves down, the outer shell 1B presses the end plate 2B through the mounting portion of the bladder 3B. Thereby, the mounting portion 3a of the bladder 3B is held between the end plate 2B and the outer shell 1B.

After the introduction of the pressurized gas and the caulking joining, the release valve 19a is opened to return the interior of the closed space S to a normal pressure. The first mold 11A is moved down to remove the fabricated accumulator.

EMBODIMENTS 8–12

Embodiments 8 to 12 according to the present invention will be described hereinafter.

Figure 13:
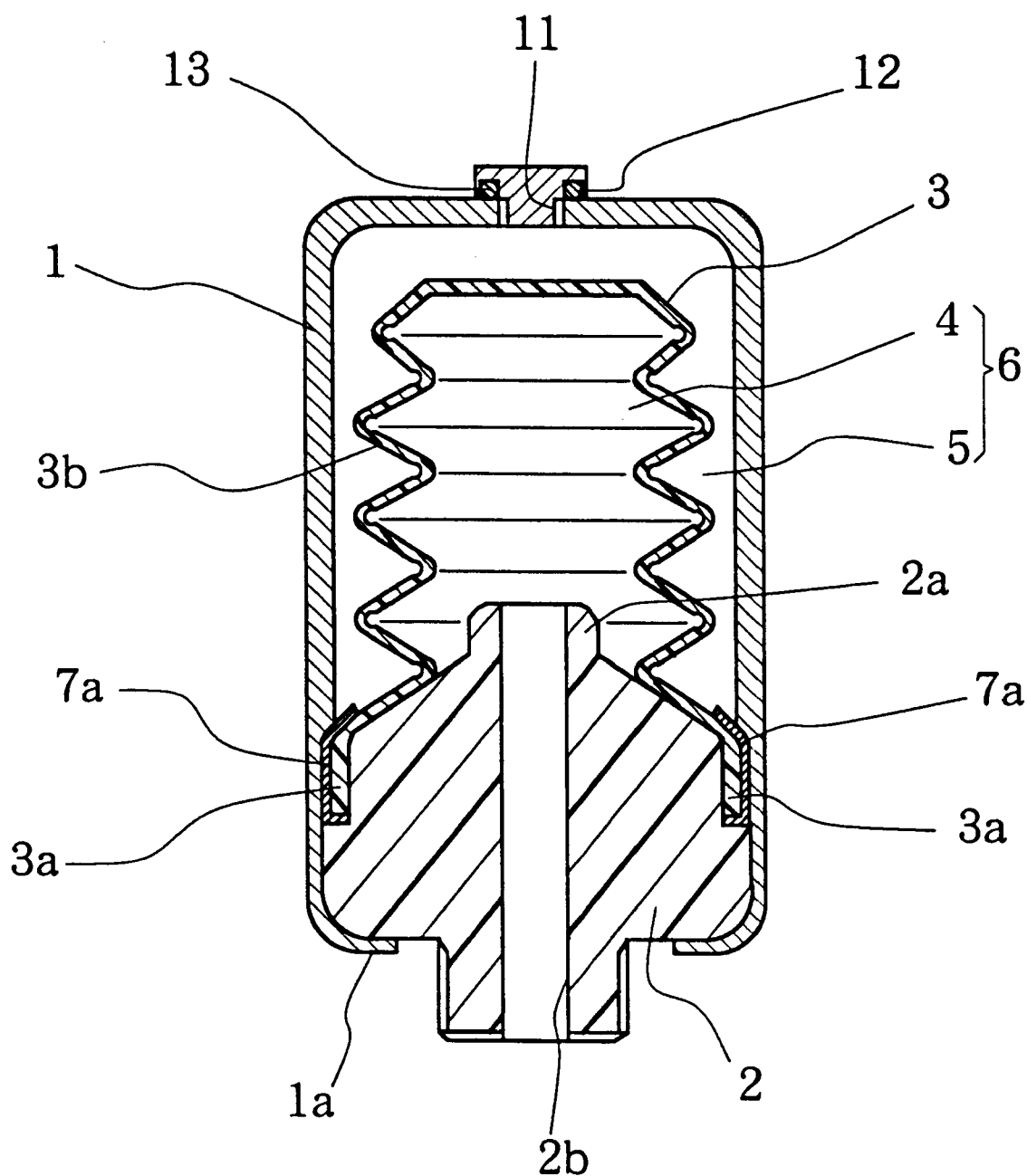
FIG. 13 is a sectional view showing an accumulator according to one embodiment of the present invention.

FIG. 13 is a sectional view showing an accumulator according to Embodiment 8 of the present invention. FIG. 14A is a sectional view of essential parts showing a mounting construction of a bellows of the accumulator.

The whole construction of the accumulator in Embodiments 8 to 12 is basically the same as that shown in FIG. 13. A modification of the mounting construction of the bellows shown in FIG. 14A is shown in FIGS. 14B to 21.

The accumulator in Embodiments 8 to 12 is, for example, a bellows type accumulator made of resin. As shown in FIG. 13, a gas-impervious resin-made bellows 3 is expansibly mounted within an accumulator chamber 6 surrounded by a shell 1 and an end plate 2. The resin-made bellows 3 is mounted in the accumulator chamber 6 to divide the accumulator chamber 6 into a liquid chamber 4 formed within the bellows 3 and a gas chamber 5 surrounded by the bellows 3 and the shell 1.

The resin-made bellows 3 is formed into a so-called bellows in which a divergent conical surface and an inverted conical surface are alternately and continuously formed integrally on the disc-like top. A bellows portion of the resin-made bellows is axially expanded and contracted due to a difference in pressure between inside and outside acting on the resin-made bellows 3 so as to perform the function of the accumulator. A mounting portion 3a at the open end of the resin-made bellows 3 is sandwiched between joining surfaces of the shell 1 and the end plate 2, and a sheet-like seal portion 7a having an L section is provided between the mounting portion 3a of the bellows and the shell 2. Thereby, the gas chamber 5 and the liquid chamber 4 are sealed. The mounting construction of the bellows will be described later.

Incidentally, the end plate 2 can be joined to the shell 1 by caulking an open end 1a of the shell 1.

The end plate 2 is formed with a stopper 2a which extrudes into the liquid chamber 4 so as to control a minimal compressed position of the resin-made bellows 3. The end plate 2 is formed with a liquid inlet port 2b in communication with the liquid chamber 4 formed in the resin-made bellows 3. At the foot of the stopper 2a is formed an inclined surface according to an inclined plane of the bellows 3.

On the other hand, at the top of the shell 1 is formed a gas inlet 11 in communication with the gas chamber 5 formed between the resin-made bellows 3 and the inner surface of the shell 1. A plug 12 for sealing the gas chamber 5 is screwed into the gas inlet 11 through an O-ring 13.

A gas having a predetermined pressure (an inert gas, for example, such as nitrogen gas) is enclosed into the gas chamber 5 through the gas inlet 11. When the liquid inlet port 2b formed in the end plate 2 is connected to a liquid pipe or the like not shown, a difference in pressure between the internal liquid chamber 4 and the external gas chamber 5 acts on the resin-made bellows 3 so that the resin-made bellows 3 is axially expanded and contracted in a direction of relieving a variation of pressure of the liquid pipe. As a result, it is possible to effectively prevent the variation of pressure of the liquid pipe or the like, for example, a water hammer.

The resin constituting the bellows 3 is not particularly limited to rubber, synthetic resin and so forth but for example, a thermoplastic elastomer which is excellent in durability such as gas resistant permeability, rigidity or heat resistance can be exemplified. Particularly, in the case where the accumulator is applied to a pipe for drinking water, it is preferred that ethylene vinyl alcohol or the like which has no influence at all on human body be used. Further, the process for making the resin-made bellows 3 is not particularly limited, but for example, blow molding, liquid molding, injection molding and so on can be exemplified.

Further, while the bellows 3 can be formed of one kind of resin, it is to be noted that a multi-layer construction comprising a plurality of kinds of resin may be employed. The multi-layer construction may be obtained, for example, by forming soft relief layers comprising polypropylene or polyamide on the surface and back of a gas barrier comprising ethylene vinyl alcohol. The gas barrier layer exhibits the gas resistant permeability performance to cut off the transmission of gas from the gas chamber 5. On the other hand, the soft relief layer has a function for protecting the gas barrier layer from sucking water and a function for relieving a strain of a rugged portion since the gas barrier layer is hard.

In order to adhere the gas barrier layer to the soft relief layer, use can be made, for example, of an adhesive which is excellent in compatibility with respect to a material constituting both the layers between both the layers. However, in the case where the gas barrier layer comprises ethylene vinyl alcohol and the soft relief layer comprises polyamide, it is not necessary to use such an adhesive as just mentioned for the purpose of adhesion.

On the other hand, a regid resin may be adopted besides metal as a material constituting the end plate. As the synthetic resin, use can be made of the resin which is excellent in durability such as rigidity and heat resistance though not particularly limited. Particularly, in the case where the accumulator is applied to a pipe for drinking water, it is preferred that polypropylene or the like which has no influence at all on human body be used. Further, the end plate 2 is not necessarily formed of synthetic resin, but materials which are excellent in anticorrosive performance, for example, such as stainless steel, brass and the like and are hygienic may be selected other than the aforementioned resins.

As described above, if all parts in contact with liquids (for example, water) are formed of synthetic resin, or a part thereof is formed of metal which is excellent in anticorrosive performance, a very hygienic accumulator can be obtained. Further, if the bellows 3 is formed of a material having a comparatively small Young's modulus such as ethylene vinyl alcohol, the operating range can be enlarged even if the number of ridges of the bellows is less, and the overall length of the accumulator may be shorten.

In addition, when the bellows 3 is formed of the same synthetic resin as that of the end plate 2, it is possible to integrate the end plate with the bellows by means such as welding after the bellows has been mounted on the end plate, thereby improving the sealability between the liquid chamber and the gas chamber.

In the following, Embodiments 8 to 12 in connection with the mounting portion of the bellows will be described.

EMBODIMENT 8

Particularly, in Embodiment 8, a sheet-like seal member (a seal portion) 7a is arranged in the outer periphery of the mounting portion 3a of the bellows. For the seal member 7a, a material which is excellent in gas impermeability is preferably used. For example, a butyl rubber (IIR) can be exemplified.

In the mounting construction of the bellows shown in FIGS. 13 and 14A, the mounting portion 3a of the bellows is formed to have substantially the same wall thickness as that of the bellows 3b, and a seal member 7a is arranged so as to cover the outer periphery and the end of the mounting portion 3a of the bellows. It is necessary at least to have the seal member 7a held between the mounting portion 3a of the bellows and the shell 1 but it can be formed slightly longer in the direction of the bellows 3b as shown in FIG. 14A. Preferably, the seal member 7a is provided so as to cover the end of the mounting portion 3a of the bellows as shown in FIG. 14A.

As described above, when the sheet-like seal member 7a is arranged in the outer periphery of the mounting portion 3a of the bellows lengthwise with respect to the axial direction of the peripheral surface, even if the gas enclosed into the was chamber 5 should pass through between the shell 1 and the bellows mounting portion 3a to leak outside, it is possible to effectively prevent the transmission of the gas since the seal member 7a is arranged lengthwise in the direction in which the gas permeates.

Further, since the seal member can be provided in the outer periphery of the mounting portion 3a of the bellows, a seal member 7b may be used so as to cover the inner peripheral surface other than the outer peripheral surface and the end of the mounting portion 3a of the bellows, as shown in FIG. 14B. In this case, it is possible to prevent the liquid flown into the liquid chamber 4 from leaking outside passing through the clearance between the mounting portion 3a of the bellows and the end plate 2, in addition to the aforementioned operation and effect.

EMBODIMENT 9

Figure 15A:
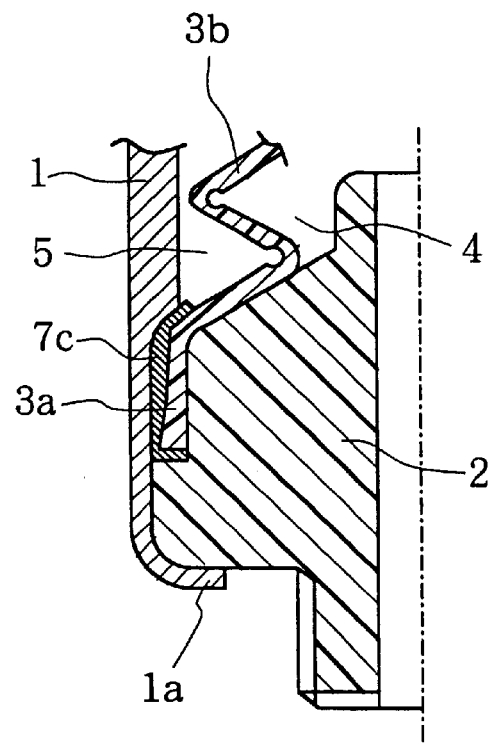
FIGS. 15A and 15B are respectively sectional views of essential parts showing a construction of a bellows mounting portion according to another embodiment of the present invention.
Figure 15B:
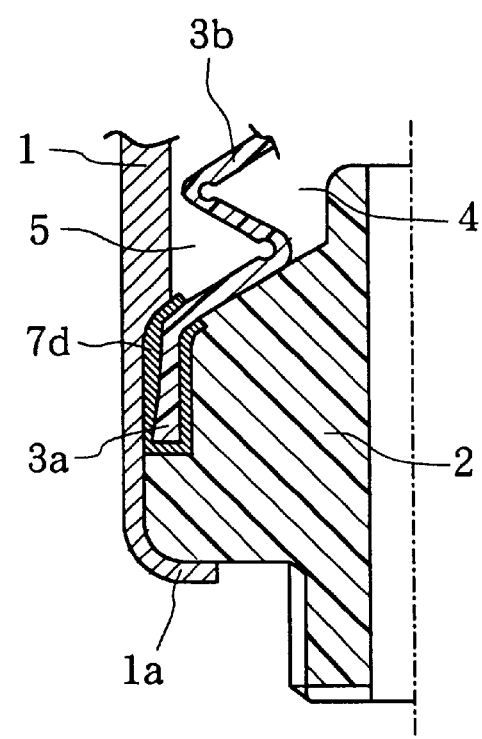

Further, in the mounting construction of the bellows shown in FIGS. 15A and 15B, wedge-like seal members (seal portions) 7c and 7d are arranged in the outer periphery of the bellows mounting portion 3a. In specific examples, the seal member 7c shown in FIG. 15A is provided only in the outer peripheral surface and the end of the mounting portion 3a of the bellows, whereas the seal member 7d shown in FIG. 15B is also provided in the inner peripheral surface of the mounting portion 3a of the bellows.

The seal members 7c and 7d having a wedge-like shape in section are of a wedge shape which is sharp toward the extreme end of the mounting portion 3a of the bellows, and the mounting portion 3a of the bellows is also formed to be inverted toward the extreme end according to the wedge shape. While an angle constituting the wedge shape is not particularly limited, it should be noted that this angle comprises one of factors which greatly influence on the sealing performance and the dislocation force caused by the wedge effect. The section of the seal members 7c and 7d is formed into a wedge at least on the side of the outer peripheral surface of the mounting portion 3a of the bellows. While in the seal member 7d shown in FIG. 15B, the inner peripheral surface of the mounting portion 3a of the bellows is formed linearly, it is to be noted that the inner peripheral surface may also be of a wedge-shape in section.

In the thus constructed accumulator, when the bellows 3 expands to exert a tensile force on the mounting portion 3a of the bellows, the seal members 7c and 7d are tightened due to the wedge effect of the seal member 7c and 7d to come into close contact with the mounting portion 3a of the bellows, thus preventing the permeation of the gas lengthwise.

At the same time, since the mounting portion 3a of the bellows is also tightened, not only the sealability of the bellows mounting portion 3a but also the leakage of liquid from the gas chamber 5 as well as the liquid chamber 4 can be effectively prevented. This effect is notable particularly in the embodiment shown in FIG. 15B.

In addition, since both the seal members 7c and 7d and the bellows mounting portion 3a are tightened, even if the dislocation force acts on the mounting portion 3a of the bellows as the bellows 3 expands, the bellows can be firmly held.

EMBODIMENT 10

Figure 16A:
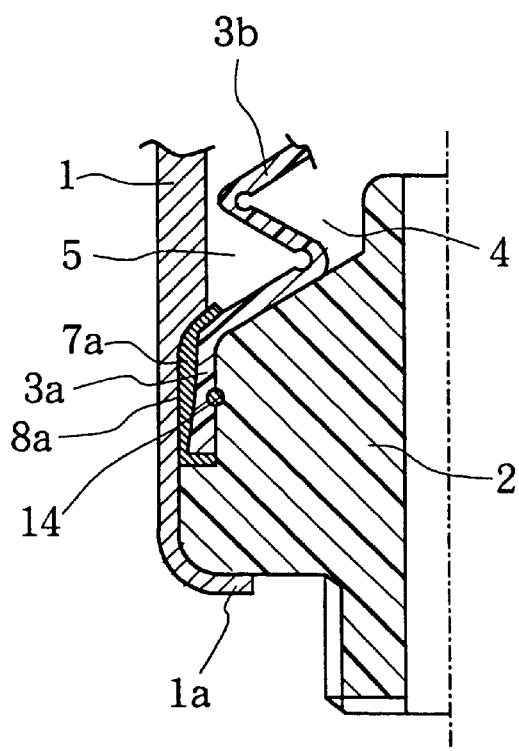
FIGS. 16A and 16B are respectively sectional views of essential parts showing a construction of a bellows mounting portion according to still another embodiment of the present invention.

In the mounting construction of the bellows shown in FIG. 16A, unlike the mounting construction shown in FIG. 14A, a protrusion 8a for pressing the seal member 7 is formed in the outer periphery of the mounting portion 3a of the bellows, and an O-ring 14 is interposed between the inner peripheral surface of the mounting portion 3a of the bellows and the end plate 2.

Figure 16B:
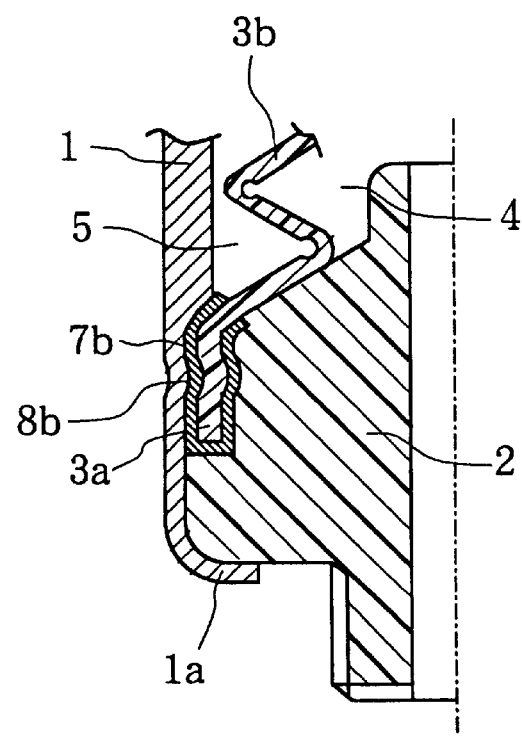

In the embodiment shown in FIG. 16B, a seal member 7b is held between the mounting portion 3a of the bellows, the shell 1 and the end plate 2, and after this, the outer surface of the shell 1 is caulked to thereby form a protrusion 8b for pressing the seal member 7b against the shell 1 and the mounting portion 3a of the bellows.

Figure 17A:
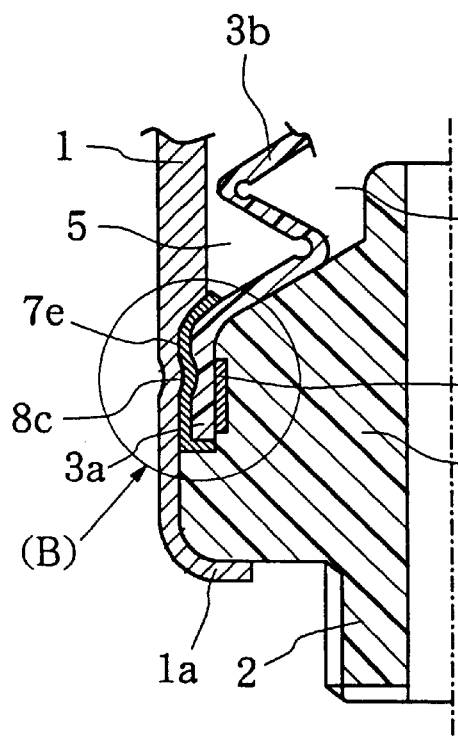
FIG. 17A is a sectional view of essential parts showing a construction of a bellows mounting portion according to another embodiment.
Figure 17B:
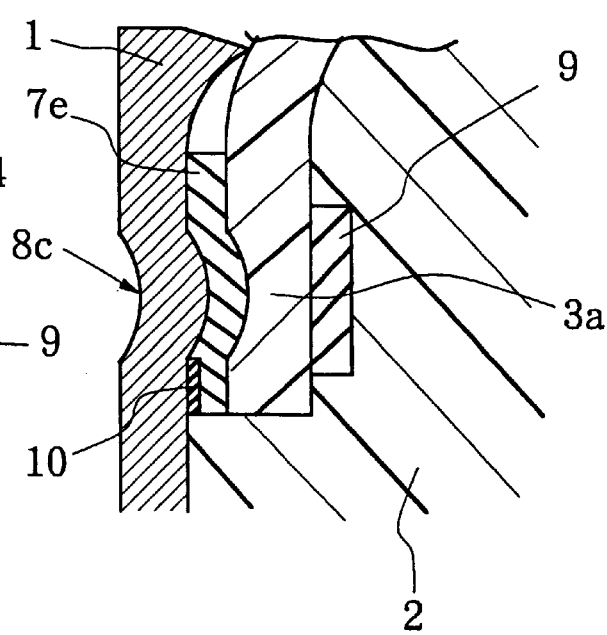
FIG. 17B being an enlarged sectional view of FIG. 17A.

In the embodiments shown in FIGS. 17A and 17B, a seal member 7e for gas is provided in the outer periphery of the mounting portion 3a of the bellows, and a seal member 9 for liquid is provided in the inner periphery of the mounting portion 3a. The mounting construction of the bellows shown in FIGS. 17A and 17B can be realized by tightening the outer periphery of the seal member 7e for gas by a rubber band 10, fixing the mounting portion 3a and the seal member 9 to the outer periphery of the end plate 2, and thereafter holding the mounting portion 3a of the bellows, the seal member 7e for gas and the seal member 9 for liquid by the shell 1 and the end plate 2. The outer surface of the shell 1 is caulked whereby to form a protrusion 8c for pressing the seal member 7e on the shell 1 and the mounting portion 3a of the bellows. In this case, preferably, the seal member 7e for gas is formed for example, of butyl rubber which is excellent in gas impermeability, whereas the seal member 9 for liquid is formed for example, of ethylene propylene rubber (EPDM) which is excellent in anti-water absorption.

As described above, when the sheet-like seal members 7a, 7b and 7e are arranged in the outer periphery of the mounting portion 3a of the bellows lengthwise with respect to the axial direction of the peripheral surface and the protrusions 8a, 8b and 8c are formed on the shell 1 or the mounting portion 3 of the bellows, even if the gas introduced into the gas chamber 5 passes through between the shell 1 and the bellows mounting portion 3a to leak outside, it is possible to prevent the permeation of the gas since the seal members 7a, 7b and 7c are arranged lengthwise in the direction of permeation of the gas. In addition, the sealability of the mounting portion 3a of the bellows is promoted by the presence of the protrusions 8a, 8b and 8c to more firmly hold the mounting portion 3a of the bellows, this preventing the bellows 3 from dislocation. Further, since the seal members 9 and 14 for liquid are arranged in the inner peripheral surface of the mounting portion 3a of the bellows, the sealing performance of the liquid chamber 4 can be geometrically improved.

EMBODIMENT 11

Since the resin-made bellows 3 is generally produced by blow molding process, the management of the wall thickness thereof is extremely difficult. Particularly, in the aforementioned mounting construction of the bellows, when the wail thickness of the mounting portion 3a of the bellows becomes thin, unevenness thereof cannot be absorbed by the seal members 7a to 7e. Therefore, the sealing performance of the mounting portion 3a becomes doubtful. Further, even if the mounting portion 3a of the bellows is produced with its wall thickness within a proper range of tolerance, a treat tensile force acts on the mounting portion 3a of the bellows during the use of the accumulator (when the internal pressure of the liquid chamber increases), and therefore, a permanent strain such as reduction in creep occurs in the mounting portion 3a of the bellows so that the wall thickness likely reduces during the use. In addition, since the shape of the seal members 7a to 7e is complicated as compared with the conventional O-ring or the like, the moldability and mounting properties of the seal members are doubtful.

From a viewpoint of the foregoing, the following process is employed in Embodiment 11 in order to further improve various performances of the accumulator shown in Embodiments 8 to 10.

That is, while in Embodiments 8 to 10, the sheet-like seal members 7a to 7e are provided lengthwise with respect to the axial direction of the peripheral surface between the shell 1 and the mounting portion 3a of the bellows, it is to be noted that in Embodiment 11, an annular spacer 15 formed into a wedge-shape in section having a thickness to some extent is provided between the shell 1 and the mounting portion 3a of the bellows. This annular spacer 15 is preferably formed of a material which is excellent in gas impermeability, for example, such as butyl rubber (11 R).

In addition, a holding surface 2c of the mounting portion 3a of the bellows in the end plate 2 is formed into a tapered-shape corresponding to the wedge-shape of the annular spacer 15, and the mounting portion 3a of the bellows is held by the construction of these annular spacer 15 and the holding surface 2c of the end plate. Reference numeral 16 designates an O-ring formed, for example, of a material which is excellent in gas impermeability, the O-ring being provided to improve the sealing performance between the shell 1 and the annular spacer 15.

Figure 19A:
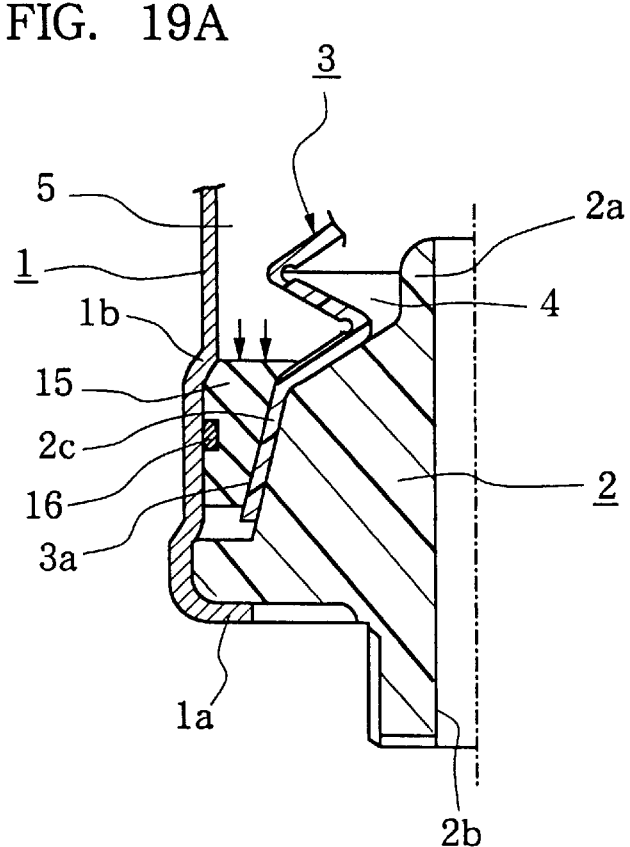
FIGS. 19A and 19B are respectively enlarged sectional views of essential parts showing a construction of a bellows mounting portion according to another embodiment of the present invention.
Figure 19B:
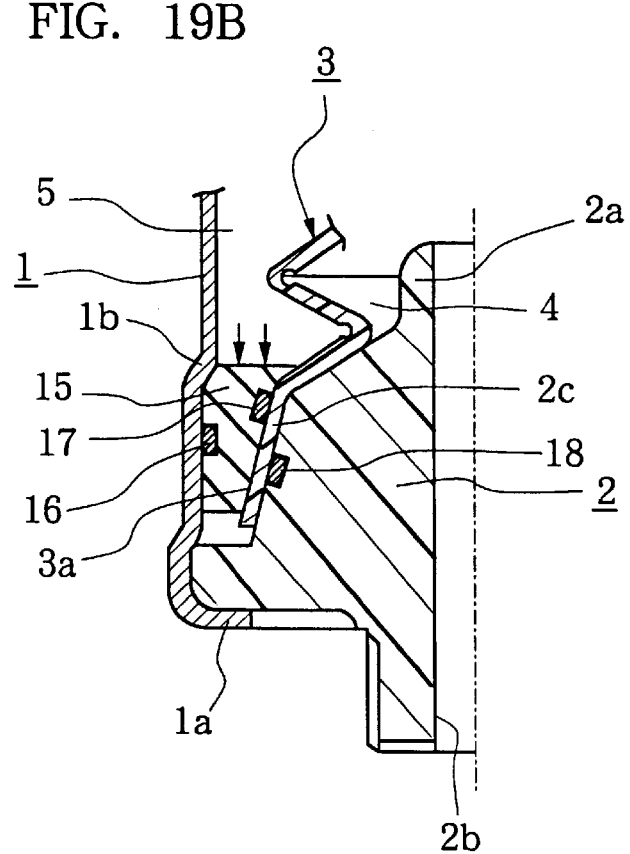

Such an accumulator is mounted by first placing the mounting portion 3a of the bellows on the holding surface 2c of the end plate, and fitting the annular spacer 15 thereon. Then, the shell is placed thereon, after which the open end 1a of the shell is caulked. In this case, if a shoulder 1b is formed on the shell, as shown in FIGS. 19A and 19B, when the shell 1 is put on and the open end 1a is caulked, the annular spacer 15 is forced downward in the figure by the shoulder 1b to secure the sealing performance of the mounting portion 3a of the bellows.

In the thus constructed accumulator in Embodiment 11, a slight unevenness of the wall thickness of the mounting portion 3a of the bellows can be absorbed by the annular spacer 15 formed into a wedge-shape in section provided between the shell 1 and the mounting portion 3a of the bellows to provide a close mounting. Further, when pressurized gas is introduced into the gas chamber 5, the gas pressure acts on the annular spacer 15 formed into a wedge-shape, as shown by the arrow in FIG. 19A. Therefore, even if the mounting portion 3a of the bellows becomes permanently deformed and thin, it can be absorbed to maintain the sealling performance. When the liquid flows into the liquid chamber 4 so that the bellows 3 expands and the tensile force acts on the mounting portion 3a of the bellows, the mounting portion 3a is firmly tightened by the annular spacer 15 held by the shoulder 1b of the shell and formed into a wedge-shape and the holding surface 2c of the end plate to improve the sealing performance of not only the gas chamber 5 but also the liquid chamber 4. When the mounting portion 3a of the bellows is tightened as described above, a reaction with respect to the dislocation force of the bellows 3 increases to prevent dislocation.

In order to improve the sealing performance of the liquid chamber 4, preferably, a seal member such as an O-ring 18 formed for example, ethylene propylene rubber (EPDM) which is excellent in anti-water absorption is provided in the inner periphery of the mounting portion 3a of the bellows, as shown in FIG. 9B. Further, in order to improve the sealing performance of the gas chamber 5, an O-ring 17 which is excellent in gas impermeability can be also provided between the annular spacer 15 and the mounting portion 3a of the bellows, in addition to the O-ring 16.

EMBODIMENT 12

Figure 20:
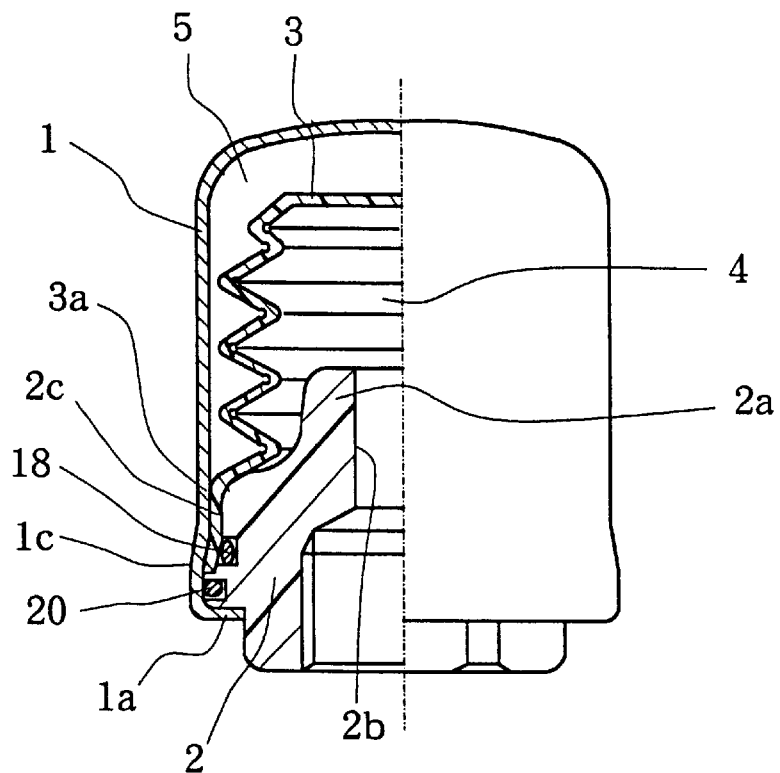
FIG. 20 is a half sectional view of an accumulator according to still another embodiment of the present invention.
Figure 21:
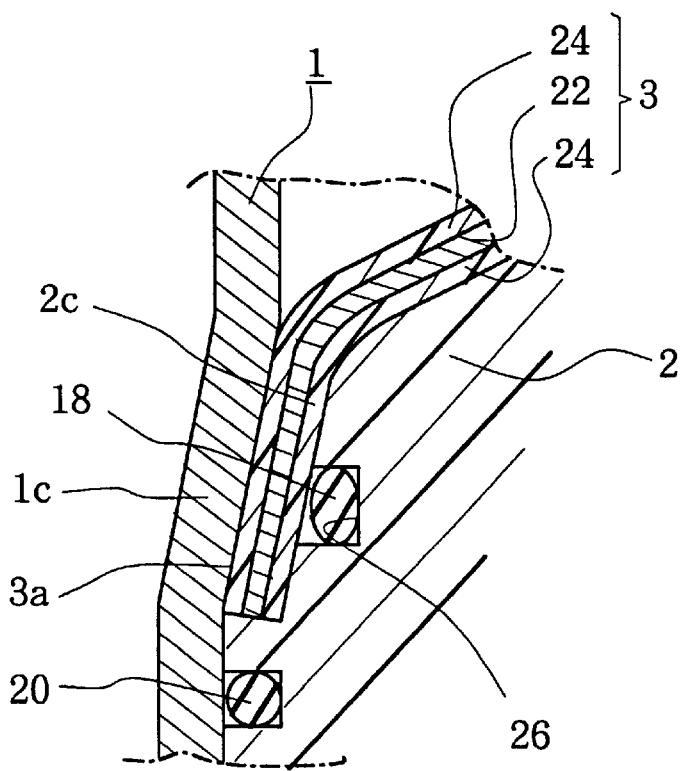
FIG. 21 is a sectional view of essential parts showing a construction of a bellows mounting portion shown in FIG. 20.

An accumulator in Embodiment 12 is a modification of the accumulator shown in FIGS. 19A and 19B, as shown in FIGS. 20 and 21. The annular spacer 15 shown in FIGS. 19A and 19B is not provided and the mounting portion 3a of the bellows 3 is directly held between a tapered holding surface 2c of the end plate 2 and a tapered shoulder 1c of the shell 1. When a distal end of the shell 1 is caulked to a distal end of the end plate 2, the mounting portion 3a of the bellows 3 creeps and the liquid chamber 4 and the gas chamber 5 are sealed by the mounting portion 3a itself of the bellows 3. From a viewpoint of this, the bellows 3 is preferably of a multi-layer construction in which a soft relief layer 24 formed for example, of polypropylene or polyamide is formed on the surface and back of a gas barrier layer 22 formed for example, of ethylene vinyl alcohol. This is because of the fact that the crept soft relief layer 24 of the mounting portion 3a of the bellows exhibits a good sealability.

In the accumulator according to Embodiment 12, an O-ring which is poor in gas impermeability is not interposed between the tapered shoulder 1c of the shell 1 and the mounting portion 3a of the bellows 3 but sealing is effected by the mounting portion 3a itself of the bellows 3, thus improving the gas impermeability and effectively preventing a gas leakage from the gas chamber 5. However, in the present embodiment, the creep of the soft relief layer 4 constituting the mounting portion 3a of the bellows 3 is utilized to effect sealing, and therefore, the sealability tends to lower with the lapse of time. Thus, the tapered holding surface 2c of the end plate 2 against of which the mounting portion 3a of the bellows 3 is pressed is formed with a seal groove 26, into which the O-ring 18 is received. A lowering portion of tension due to the creep of the resin is compensated for by the resilient force of the O-ring 18 to secure the sealability.

Further, an O-ring groove is formed in the outer periphery of the distal end of the end plate 2 and in a portion of this side where the open end 1a of the shell 1 is caulked. An O-ring 20 is received in the aforesaid groove. The O-ring 20 is compressed between the o-ring groove and the shell 1 to compensate for sealing by the mounting portion 3a itself of the bellows 3.

MODIFIED EXAMPLE

The above-described Embodiments 1 to 12 have been described for better understanding of the present invention but have not been described to limit the present invention. Accordingly, various elements disclosed in the above-described Embodiments 1 to 12 can be variously modified within the scope of the present invention.

For example, preferably, a groove for an O-ring is of a dovetail groove (an annular recess having an inverted triangular shape in section) for preventing the O-rings 13A, 13B, 15A and 15B from slipping out.

Further, the collar 7B in Embodiment 2 is not provided on the outer shell 1B but may be provided on the side of the bladder 3B for assembly.

In Embodiment 7 shown in FIG. 12, the gas to be introduced into the closed space S formed by the first mold 11A and the second mold 10A can be not only pressured gas (for example, gas of 2 to 20 atmospheric pressures) but gas of atmospheric pressure (1 atmospheric pressure). In this case, an inert gas is preferable. However, air can be used as a gas to be introduced depending on the purpose of use. Exceptionally, when air of 1 atmospheric pressure is introduced into the gas chamber 5B in the state of FIG. 12, the second mold 10A can be omitted.

Since in Embodiments 1 to 4 of the present invention, the bladder is held on the second member of the shell through the pressing member provided within the gas chamber, the sealing performance of the mounting portion of the bladder is enhanced, and the positional accuracy can be secured in place of the shoulder for locating the bladder which has been heretofore required. Thereby, the shape of the shell can be simplified and processing can be facilitated. As a result, the reduction in cost resulting from the enhancement of accuracy and the enhancement of mass producibility can be expected.

Further, if the gas chamber is composed of a double construction comprising a first member like an outer shell of a shell and a pressing member like a collar, the pressure tightness is enhanced, thereby making the shell thinner and contributing to the reduction in weight. Because of this, this can be preferably used for an accumulator for an automobile, for example.

Furthermore, in Embodiments 1 to 4 of the present invention, when the bladder is held on the second member through the pressing member, the accumulator can be easily assembled. The temporarily mounted accumulator is placed in an atmosphere of high pressure gas to be enclosed, in which state the shell is joined whereby the pressured gas can be enclosed into the gas chamber.

Such an accumulator as described can be easily assembled by a simple and inexpensive assembling apparatus comprising a first mold for holding a first member of a shell, a second mold for cooperating with the first mold to form a closed space therein, a frame for holding a second member of a shell, and a gas delivery means for introducing gas into the closed space.

According to the present invention, a conventional gas inlet hole formed in a shell can be omitted. As a result, a leakage of gas caused by the gas inlet hole can be prevented, and pressure in the gas chamber can be maintained constant for a long period of time. Therefore, the service life of the accumulator can be prolonged, and for example, the use thereof to a part requiring a free maintenance can be expected.

Figure 18A:
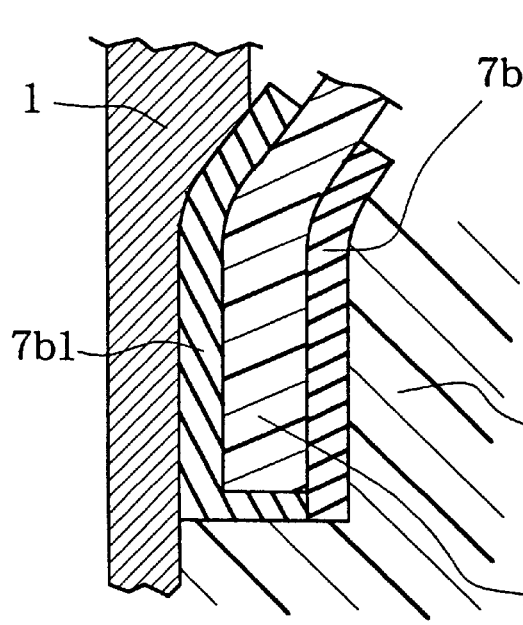
FIGS. 18A and 18B are respectively enlarged sectional views of essential parts showing a construction of a bellows mounting portion according to a further embodiment of the present invention.
Figure 18B:
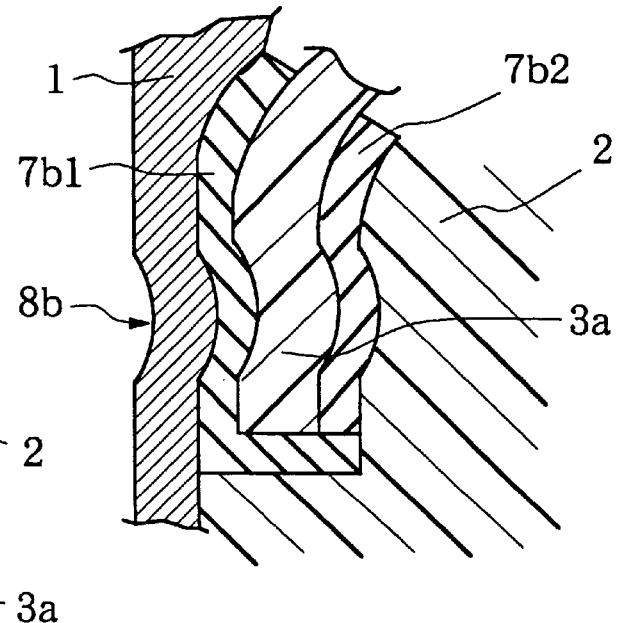

For example, the seal member 7b shown in FIGS. 14B and 16B may be divided into a seal member 7b1 for gas and a seal member 7b2 for liquid as shown in FIG. 18A or 18B. In this case, preferably, for example, a butyl rubber excellent in gas impermeability is used as the seal member 7b1 for gas, whereas for example, an ethylene propylene rubber (EPDM) excellent in anti-water absorption is used as the seal member 7b2 for liquid.

Further, the joining means between the shell 1 and the end plate 2 is not particularly limited but not only the caulking as described above but also welding and other joining means can be employed. Moreover, with respect to the gas plug 12 mounted on the top of the shell 1, for example, a plate may be welded other than screwing type.

In the accumulator according to Embodiment 8, since a sheet-like seal member having a small sectional area is arranged in the outer periphery of a bellows mounting portion lengthwise with respect to the axial direction of the peripheral surface, even if the gas enclosed into the gas chamber tends to leak outside passing through between the shell and the bellows mounting portion, it is possible to prevent the gas from permeation as if many weirs are formed because the seal member is arranged lengthwise in the direction of permeation of the gas. Moreover, since the mounting portion of the bellows can be made thinner, the whole bellows can be molded thinner to provide the effect in excellent in responsiveness.

In the accumulator according to Embodiment 9, since a sheet member whose section is in the form of a wedge is arranged in the outer periphery of the bellows mounting portion, when the bellows expands so that tensile force acts on the mounting portion of the bellows, the seal is tightened due to the wedge effect of the seal member to provide a close contact with the mounting portion of the bellows, thus preventing the gas from lengthwise permeation. At the same time, since the mounting portion of the bellows is also tightened, the sealing performance of the bellows mounting portion is enhanced, that is, the leakage of liquid from not only the air chamber but also the liquid chamber can be effectively prevented. In addition, since the seal member and the bellows mounting portion are tightened, even if the dislocation force acts on the mounting portion of the bellows as the bellows expands, the bellows can be firmly held.

In the accumulator according to Embodiment 10, since a sheet-like seal member is arranged in the outer periphery of the mounting portion of the shell or the bellows lengthwise with respect to the axial direction of the peripheral surface and a protrusion is formed on the mounting portion of the bellows so as to press the seal member, even if the gas enclosed into the gas chamber tends to leak outside passing through between the shell and the bellows mounting portion, the tissue of the pressing portion becomes dense to prevent the gas from permeation. In addition, the mounting portion of the bellows can be firmly held by the protrusion to prevent the bellows from dislocation.

At this time, since a sheet-like member made of a seal material excellent with respect to liquid is arranged in the inner periphery of the mounting portion of the bellows, the sealing performance of the liquid chamber can be geometrically enhanced.

In the accumulator according to Embodiment 11, since an annular spacer whose section is in the form of a wedge is provided between the shell and the mounting portion and a holding surface of the end plate on which the mounting portion is held is formed into an inclined configuration according to the wedge-shape of the annular spacer, even if the wall thickness of the mounting portion of the bellows is somewhat uneven, it can be absorbed to provide a close mounting. Furthermore, when a high pressure gas is introduced into the gas chamber, this pressure acts on the annular spacer formed into a wedge-shape, and therefore, even if the mounting portion of the bellows becomes permanently deformed and thin, it can be absorbed to maintain the scaling performance. Moreover, when the liquid flows into the liquid chamber so that the bellows expands and the tensile force acts on the mounting portion of the bellows, the mounting portion is firmly tightened by the annular spacer formed into a wedge shape and the holding surface of the end plate, whereby the sealing performance of not only the gas chamber but also the liquid chamber are enhanced. When the mounting portion of the bellows is tightened as described above, the reaction with respect to the dislocation force of the bellows increases to prevent the dislocation. In the accumulator according to Embodiment 12, since the sealing is effected by the mounting portion of the bellows without interposition of an O-ring which is poor in gas impermeability between the tapered shoulder of the shell and the mounting portion of the bellows, the gas impermeability is enhanced and the leakage of gas from the gas chamber can be effectively prevented.

We claim:

1. A process for making an accumulator comprising the steps of assembling a first member, a second member and a bladder so that the first and second members form a shell having an internal space therein, the internal space being divided into a gas chamber and a liquid chamber by the bladder, wherein said gas chamber and said liquid chamber within said shell are placed in a common pressurized gas when said bladder is assembled with the first and second members.

2. The process for making an accumulator according to claim 1, wherein said first member, said second member and said bladder are assembled within a closed space in which said pressurized gas is received.

3. The process for making an accumulator according to claim 1, wherein said gas enclosed into said gas chamber is N2, CO2, Ar or He.

4. The process for making an accumulator according to claim 1, wherein a pressure of said gas within said gas chamber is 2 to 10 atmospheric pressure.

5. The process for making an accumulator according to claim 1, wherein said fixing step includes a step of caulking said first member to fix said second member to said first member.

6. The process for making an accumulator according to claim 1, wherein said fixing step includes a step of screwing said first member to said second member.

7. A process for making an accumulator comprising the steps of assembling a first member, a second member and a bladder so that the first and second members form a shell having an internal space therein, the internal space being divided into a gas chamber and a liquid chamber by the bladder, wherein said liquid chamber is placed under a negative pressure to place said bladder in a minimal compressed state and a gas is introduced into said gas chamber within said shell when said bladder is assembled with the first and second members.

8. The process for making an accumulator according to claim 7, wherein said first member, said second member and said bladder are assembled within a closed space in which a pressurized gas is received.

9. The process for making an accumulator according to claim 7, wherein said gas introduced into said gas chamber is N2, CO2, Ar or He.

10. The process for making an accumulator according to claim 7, wherein a pressure of said gas within said gas chamber is 2 to 10 atmospheric pressure.

11. The process for making an accumulator according to claim 8, wherein when said bladder is in a minimal compressed state, a gas pressure within said gas chamber is 1 atmospheric pressure.

12. The process for making an accumulator according to claim 7, wherein said fixing step includes a step of caulking said first member to fix said second member to said first member.

13. The process for making an accumulator according to claim 7, wherein said fixing step includes a step of screwing said first member to said second member.

* * * * *